(12) United States Patent
Young

(10) Patent No.: US 6,680,202 B2
(45) Date of Patent: *Jan. 20, 2004

(54) METHOD FOR CONCURRENT AND SEQUENTIAL MULTI-STEP REACTIONS FOR PRODUCING A PLURALITY OF DIFFERENT CHEMICAL COMPOUNDS

(75) Inventor: Li Young, Bridgewater Township, Somerset County, NJ (US)

(73) Assignee: Advanced Automations, L.L.C., Hillsborough, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/391,661

(22) Filed: Mar. 19, 2003

(65) Prior Publication Data

US 2003/0186445 A1 Oct. 2, 2003

Related U.S. Application Data

(60) Division of application No. 09/335,342, filed on Jun. 17, 1999, now Pat. No. 6,537,504, which is a continuation-in-part of application No. 09/055,511, filed on Apr. 6, 1998, now abandoned.

(51) Int. Cl.[7] .............................................. G01N 35/02

(52) U.S. Cl. .............................. 436/48; 436/52; 436/43; 436/46; 436/807; 436/808; 436/809; 435/DIG. 1; 435/DIG. 46; 435/DIG. 49

(58) Field of Search .............................. 436/48, 43, 46, 436/52, 807, 808, 809; 435/DIG. 1, DIG. 46, DIG. 49

(56) References Cited

U.S. PATENT DOCUMENTS

| | | | |
|---|---|---|---|
| 4,622,332 A | 11/1986 | Wehinger et al. | 514/356 |
| 4,631,211 A | 12/1986 | Houghten | 428/35 |
| 4,665,081 A | 5/1987 | Doi et al. | 514/356 |
| 4,874,774 A | 10/1989 | Ushimaru et al. | 514/356 |
| 4,894,235 A | 1/1990 | Kohne et al. | 424/452 |
| 5,264,446 A | 11/1993 | Hegasy et al. | 514/356 |
| 5,463,564 A | 10/1995 | Agrafiotis et al. | 364/496 |

OTHER PUBLICATIONS

Pinilla et al. "Tea bag synthesis of positional scanning synthetic combinatorial libraries and their use for mapping antigenic determinants", Methods in Molecular Biology (Totowa, New Jersey) (1996), 66(Epitope Mapping Protocols), 171–179.*

Pinilla et al. "The generation of peptide combinatorial libraries using tea–bag synthesis: identification of B–cell epitopes", Immunology Methods Manual (1997), vol. 2, 835–845.*

* cited by examiner

*Primary Examiner*—Jill Warden
*Assistant Examiner*—Yelena G. Gakh
(74) *Attorney, Agent, or Firm*—Kenneth P. Glynn, Esq.

(57) ABSTRACT

The present invention is a method and an apparatus to provide a dynamic matrix system for synthesizing a plurality of chemical compounds simultaneously, i.e. in parallel, and to synthesize a series of plurality of simultaneously synthesized chemical compounds sequentially, i.e. in series. The apparatus includes a base support structure, a physical chemistry teabag support structure, a plurality of physical chemistry teabags and a fixed-reactant/liquid reactant mixture shifting (changing) mechanism. The base support structure has a plurality of reaction vessels arranged in at least a two dimensional predetermined array. The physical chemistry teabag support structure is adapted to hold and support a plurality of physical chemistry teabags arranged in at least a two dimensional predetermined teabag array, at least partially coinciding with the base support structure reaction vessel array. The teabags have at least one predetermined fixed reactant thereon. The fixed-reactant/liquid reactant mixture shifting mechanism is adapted to alter specific fixed reactant-liquid reactant mixture combinations using fluid flow mechanisms and/or mechanical mechanisms, for at least a portion of the plurality of physical chemistry teabags relative to the liquid reactant mixture content of the plurality of reaction vessels for simultaneous different reactions, and to sequentially effect other different reactions.

20 Claims, 19 Drawing Sheets

FIGURE 2

SECOND ARRAY/RESULTANT PRODUCTS

| | I | II | III | IV | V | | REAGENT I.D. |
|---|---|---|---|---|---|---|---|
| 3a | 4e | 4j | 4o | 4t | 4y | 14 | NONE → |
| 3b | 4d | 4i | 4n | 4s | 4x | 15 | NONE → |
| 3c | 4c | 4h | 4m | 4r | 4w | 16 | NONE → |
| 3d | 4b | 4g | 4l | 4q | 4v | 17 | NONE → |
| 3e | 4a | 4f | 4k | 4p | 4u | 18 | NONE → |

FIGURE 9A (PRIOR ART)    INITIAL RESIN    POLYMER REACTANT
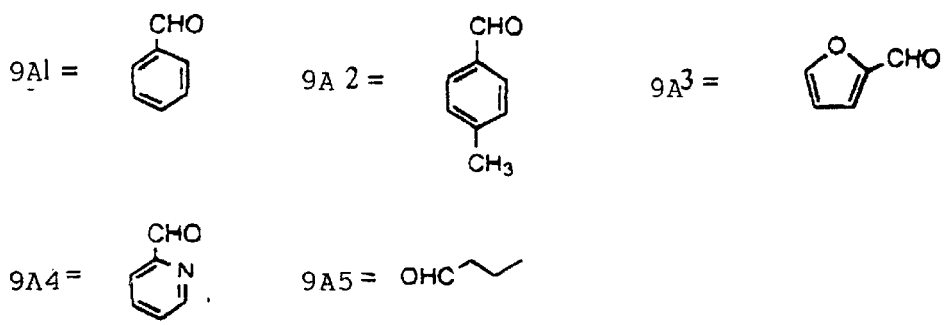
FIGURE 9B (PRIOR ART)    (REACTANTS)
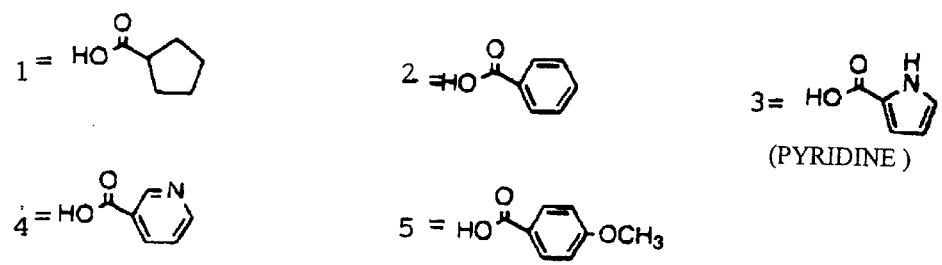

SECOND ARRAY                    PRODUCT

THIRD ARRAY PRODUCT

FIFTH ARRAY                                    PRODUCT

METHOD FOR CONCURRENT AND SEQUENTIAL MULTI-STEP REACTIONS FOR PRODUCING A PLURALITY OF DIFFERENT CHEMICAL COMPOUNDS

REFERENCE TO RELATED APPLICATION

This application is a Divisional Application of a patent application Ser. No. 09/335,342 filed on Jun. 17, 1999 now U.S. Pat. No. 6,537,504 and entitled "Method And Apparatus For Concurrent And Sequential Multi-Step Reactions For Producing A Plurality Of Different Chemical Compounds" by the same Inventor herein, which application was a Continuation-in-Part of U.S. patent application Ser. No. 09/055,511, filed on Apr. 6, 1998, now abandoned and entitled "A Method and Apparatus For Solid Phase Concurrently Geometrically Producing Multiple Different Organic Compounds" by the inventor herein.

BACKGROUND OF THE INVENTION

1. Field of the Invention

The present invention is directed to an apparatus and a method for simultaneous reactions to produce a plurality of different chemical compounds and to effect a series of such simultaneous types of reactions sequential. It relies upon a multidimensional array of reaction vessels with liquid reaction mixtures and a separate array of "teabags" having fixed reactants located thereon. The invention relies upon shifting (changing) the combinations of fixed-reactant/liquid reaction mixtures to create a series of sequential groupings of different simultaneous reactants.

2. Information Disclosure Statement

The following prior art relates to methods and apparatuses for producing nifedipine type organic compounds and to methods of making a plurality of compounds:

U.S. Pat. No. 4,622,332 issued Nov. 11, 1986 to Egbert Wehinger et al. describes symmetric diesters of hantzsch dihydropyridines with hypotensive activity.

U.S. Pat. No. 4,631,211 issued Dec. 23, 1986 to Richard A. Houghten describes a means for carrying out sequential, solid phase syntheses which is disclosed as are methods of its use. The synthesis means comprises a foraminous container that encloses reactive particles. The particles are larger than any of the foraminae and have a known amount of covalently linked organic synthesis reactive functionality that is capable of reacting during the organic syntheses. The container and particles are substantially insoluble in water.

U.S. Pat. No. 4,665,081 issued May 12, 1987 to Kengo Doi et al. describes a new solid nifedipine preparation which comprises (a) a particulate dry composition having been obtained by subjecting nifedipine in mixture with casein and one or more inorganic excipients to co-pulverization or (b) a particulate dry composition having been obtained by adding an enteric high molecular substance and a plasticizer optionally with a higher fatty acid ester to the co-pulverized mixture obtained above, subjecting the mixture to co-pulverization and then dry-processing the co-pulverized product to a pharmaceutically acceptable solid form, as well as a process for preparing the solid composition (a) or (b) by the specific co-pulverization and a dry compounding method. The solid nifedipine preparation is excellent in dissolution of nifedipine or possesses a controlled dissolution rate of nifedipine. This preparation is useful as a vasodilating medicament for the dual purposes of rapid and gradual release of nifedipine from the preparation for the remedy of angina pectoris or hypertension.

U.S. Pat. No. 4,874,774 issued Oct. 17, 1989 to Koichi Ushimaru describes that nifedipine is formulated into a reactually administrable composition for administration to humans and animals to effect coronary dilation and for hypotensive effect.

U.S. Pat. No. 4,894,235 issued Jan. 16, 1990 to Hans Kohne describes an improved form of administration of 1,4-dihydro-2,6-dimethyl-4-(2-nitrophenyl)-3,5-pyridine-dicarboxylic acid-dimthylester (i.e., Nifedipine) is provided in which the Nifedipine is molecularly dispersed within a solidified melt of polyethylene glycols which are liquid, semi-solid and solid at room temperature. The weight ratio of liquid to non-liquid polyethylene glycols in the solidified melt ranges from about 7:23 to 23:7, the solidification temperature of the mixture ranges from about 25 degrees Celcius to 62 degrees Celcius and the mixture has a viscosity of from about 1 to 180,000 poise when measured at 20 degrees Celcius in admixture with up to about 40 percent by weight of water.

U.S. Pat. No. 5,264,446 issued Nov. 23, 1993 to Ahmed Hegasy describes the invention is directed to the provision of solid pharmaceutical compositions (and methods for their preparation) containing mifidipine crystals with a specific surface area of 1.0 to 4.0 m2/g., in admixture with a solid diluent. The said compositions overcome the deficiencies of prior art compositions containing nifidipine, which is known to have effect as a coronary vasodilator.

U.S. Pat. No. 5,463,564 issued Oct. 31, 1995 to Dimitris K. Agrafiotis describes a computer based, iterative process for generating chemical entities with defined physical, chemical and/or bioactive properties. During each iteration of the process, (1) a directed diversity chemical library is robotically generated in accordance with robotic synthesis instructions; (2) the compounds in the directed diversity chemical library are analyzed to identify compounds with the desired properties; (3) structure-property data are used to select compounds to be synthesized in the next iteration; and (4) new robotic synthesis instructions are automatically generated to control the synthesis of the directed diversity chemical library for the next iteration.

Notwithstanding the prior art, the present invention is neither taught nor rendered obvious thereby.

SUMMARY OF THE INVENTION

The present invention is an apparatus to provide a dynamic matrix system for synthesizing a plurality of chemical compounds simultaneously, i.e. in parallel, and to synthesize a series of plurality of simultaneously synthesized chemical compounds sequentially, i.e. in series. It includes a base support structure, a physical chemistry teabag support structure, a plurality of physical chemistry teabags and a fixed-reactant/liquid reactant mixture shifting (changing) means. The base support structure has a plurality of reaction vessels arranged in at least a two dimensional predetermined array, each of said reaction vessels having sufficient wall and bottom structure to support and contain a liquid reactant mixture, each of said reaction vessels adapted to receive physical chemistry teabags therein for chemical synthesis. The physical chemistry teabag support structure is adapted to hold and support a plurality of physical chemistry teabags arranged in at least a two dimensional predetermined teabag array, at least partially coinciding with said base support structure reaction vessel array. The plurality of physical chemistry teabags has at least one predetermined fixed reactant thereon. The fixed-reactant/liquid reactant mixture shifting means is adapted to alter specific fixed reactant-liquid reactant mixture combinations for at least a portion of said plurality of physical chemistry teabags relative to the liquid reactant mixture content of said plurality of reaction vessels. In various embodiments, the fixed-reactant/liquid reactant mixture shifting means could be a dynamic fluid/flow system, a mechanical movement means, or a combination of these. When the fixed reactant-liquid reactant mixture shifting means is a dynamic fluid flow system, each of plurality of reaction vessels includes at least one liquid channel connected thereto for filling and draining said plurality reaction vessels with a sequence of different liquid reactant mixture arrays of at least one liquid reactant mixture for each reaction vessel, and said apparatus further includes sufficient channel, valve and supply means for filling and draining said plurality of reaction vessels simultaneously and sequentially in accordance with the foregoing. When the fixed-reactant/liquid reactant mixture shifting means is a mechanical movement means it is functionally connected to at least one of said base support structure and said physical chemistry teabag support structure and is adapted to effect three dimensional movement between said base support structure and said physical chemistry teabag support structure so as to provide an in-out movement capability for simultaneous insertion, simultaneous hold and simultaneous removal motion of said plurality of physical chemistry teabags with said plurality of reaction vessels, and so as to provide relocation movement capability for simultaneous and sequential movement of said plurality of physical chemistry teabag so as to relocate a given physical chemistry teabag at least from a first reaction vessel to a second reaction vessel. In most preferred embodiments, the apparatus further includes temperature monitoring means and temperature adjustment means, said temperature adjusting means being selected from the group consisting of heating means, cooling means and combinations thereof. These temperature adjustment means are functionally connected to each of the plurality of reaction vessels.

The invention also relates to a method for synthesizing a plurality of chemical compounds simultaneously and for synthesizing a plurality of chemical compounds simultaneously and to synthesize a series of plurality of simultaneously synthesized chemical compounds sequentially utilizing a dynamic matrix system. The method includes providing apparatus of the above-described types, and providing said plurality of reaction vessels with a plurality of different liquid reactant mixtures; operating said fixed-reactant/liquid reactant mixture shifting means so as to insert said plurality of physical chemistry teabags into said plurality of reaction vessels in a first position matrix for a sufficient holding time to create at least a first chemical compound synthesis; operating said fixed-reactant/liquid mixture shifting means so as to remove said plurality physical chemistry teabags from said plurality of reaction vessels; and, operating said fixed-reactant/liquid mixture shifting means so as to relocate at least one of said plurality of physical chemistry teabags relative to said plurality of reaction vessel and subsequently inserting said plurality of physical chemistry teabags into said plurality of reaction vessels in a second position matrix so that at least one of said physical chemistry teabags is positioned in a different reaction vessel from the reaction vessel of the first position matrix for a sufficient holding time to create at least a second chemical compound synthesis.

BRIEF DESCRIPTION OF THE DRAWINGS:

The present invention should be more fully understood when the specification herein is taken in conjunction with the drawings appended hereto wherein:

FIG. 2 symbolically and diagrammatically represents typically the same reactor unitary support structure aforenoted of FIG. 1, the appearance thereof after the reshifting of the separate rows into different ones of the five separately supported pervious teabag vessels in a "second array", in changed array relative to that of FIG. 1;

FIG. 9A in a table-like arrangement symbolically and diagrammatically represents (discloses) typical other conventional prior art initial polymer resin reactants utilizable in the present invention apparatus and method array reactions, as these compounds typically appear prior to being bead-mounted, separately itemized (identified) as compounds 9A1, 9A2, 9A3, 9A4 and 9A5, respectively;

FIG. 9B symbolically and diagrammatically represents in another table-like arrangement, represents (disclosed) typical conventional prior art other array-utilizable reactants to be subsequently reacted as a part of the differing sequential arrays provided by the apparatuses and method(s) of this invention, disclosing five separate merely typical prior art compounds here represented to be reacted in the merely typical novel array-arrangement method illustrated in FIG. 9C utilizing an alternative other bead-mounted polymer resin reactant;

DETAILED DESCRIPTION OF THE PRESENT INVENTION

Figure 1:
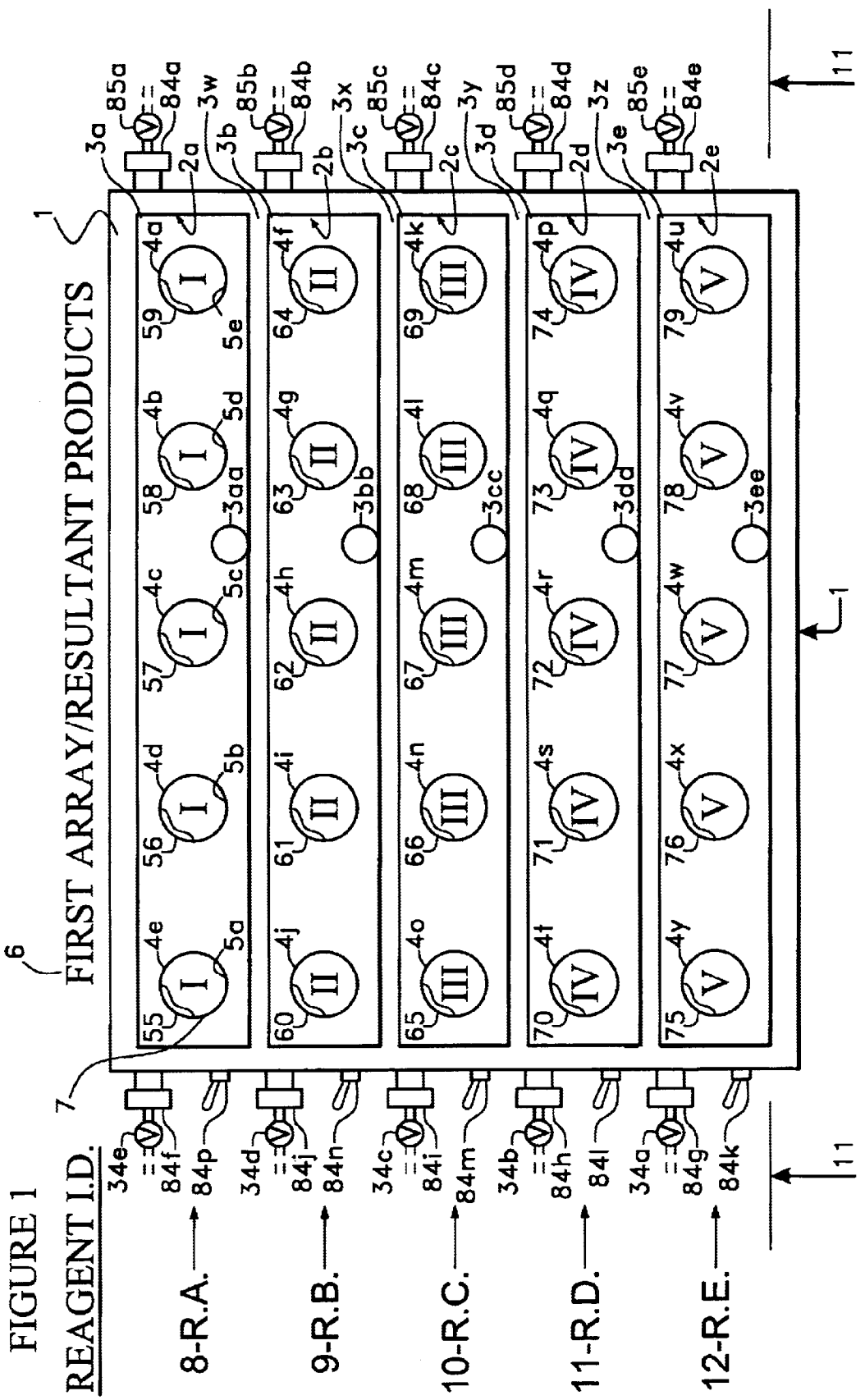
FIG. 1 symbolically and diagrammatically represents a typical embodiment of a unitary support structure mounting in a "first array" (arrangement) of five separate rows each inclusive of typically five separately supported liquid pervious teabag vessels, each of the five vessels containing a common bead-mounted initial reactant of different initial reactants (A, B, C, D, E)—the common reactant (A or B or C or D or E) for the separate rows each being different from the common reactant of each of the other remaining-teabag vessels, illustrating them to be separately supported from one-another with regard to individual contact with flowable separate (segregated) reactants (A, B, C, D, and E). Also, this figure illustrates other features more fully disclosed in FIG. 11.

The present invention relates to physical chemistry in which (prior art) non-reactive beads in porous suspended bags (commonly referred to as "teabags"), are surface-impregnated with a known chemical that does not wash-off of the beads when they are subjected to liquid suspensions and/or solutions of other reactant(s)—often referred to as "constant-surface reactants" or "fixed-reactants". In contrast thereto, solution or diluent-borne reactants in "liquid reactant mixtures" are utilized for subsequent reactions with the bead-mounted fixed-reactant. Following the first reaction between a fixed-reactant teabag and a liquid reactant mixture, even when the teabags typically contain a, plurality of fixed-reactant beads thereof, such prior art limited-structure and method require thereafter excessively time-consuming efforts to effect additional reactions. These methods and apparatus used therewith provide no solution nor answer to the heretofore required manual separation of the beads in the teabag. Once manually separated, the common (chemically-identical) beads (of the same common compound) are placed into a new common empty teabag, and time-consuming manual separation is "again" required after reaction with a liquid reactant mixture different from that of the initial re-bagged beads.

The foregoing prior art requirement of manual separation of different reacted beads, prior to subsequent additional separate reactions thereof, resulted in retarded progress and impossibility of expeditiously securing large numbers of final different new compounds (as compared to a feasibly economic rate of production). Thereby, prior methods and apparatuses significantly increased the cost of research in the production and testing of significant large numbers of potentially valuable new compounds for the pharmaceutical and/or other chemical industries.

Addressing this problem, based on the invention of solid phase peptide synthesis invented by Professor Bruce Merrifield in the 1960s, automated peptide synthesizers have been created and used commercially by companies such as Applied Biosystems Inc. of California, and Advanced Chemtech of Kentucky. The synthesizer invented by the former company can only be used to prepare solely "one single peptide" during the entire/whole operation.

The other kind of synthesizer invented by the latter company such as models 396 and 4956 are based on an X-Y-Z robotic arm utilized to conduct delivery within a plate containing fixed 96-deep wells. Those models invented by inventor(s) of Advance Chemtech (aforenoted) can be used to prepare solely up to a maximum of 96 compounds using the 96-deep well plate format. Additionally, at least five genuine problems are associated with the Advanced Chemtech models.

The first problem is the clogging of the liquid delivering tubes. Due to the size of each deep well (1 ml. total interior volume) within the 96-deep well plate all the chemical reagents can only be transferred through tubing that is of 1/32 of an inch in diameter which is connected with an X-Y-Z robotic arm for positioning the individual well. Clogging of the tubes frequently occurs because some of the chemical reagents precipitate within and block the tubes.

Also, a second problem is related to the quantity of products that are produced using the 96-deep well plate to conduct chemical synthesis. Since each deep well represents a chemical reactor, the volume of the deep well in the plate is only 1 ml. This 1 ml. volume reactor can only accommodate very small amounts of solid phase (up to 50 mg.) which is used for synthesizing compounds on this solid support. Usually this amount (50 mg.) of solid support can only produce no more than 5 mg. of product from each deep well. This mere 5 mg. of product would not be sufficient for further purification that is required for subsequent biology testing. Expensive and costly repeated larger scale synthesis would be necessary to accomplish the need after and if a particular product is identified to be of potential value and interest.

The third problem is related to the requirement of reaction temperature. Since the 96-deep wellplate is fixed within a single piece of material, the reaction temperature can only be applied to the whole (entire group of) wells of the single 96 deep-well plate, i.e. all the 96 reactions have to be conducted at all the same temperatures regardless of the different chemical reagents used, and all thereof are necessarily treated concurrently with the same additional subsequent reactant(s). Accordingly the albeit temperature control has been in the past and has continued to be an inherent design problem.

The fourth problem is the open system of the whole operation. There is no compartmental separation among the "96 reactors" even if different reagents are introduced to the neighboring wells. Potential contamination may occur between the physically closely associated (positioned) different wells.

The fifth problem is the over-simplification of chemistry when this 96 deep-well plate format is used for organic synthesis. It is to be noted that the reaction conditions for any chemical synthesis can be potentially unique for different substrates. The reaction conditions include temperature, pressure and reaction time. A lack of flexibility in the specific conditions of reaction within this design is one of the major drawbacks. Pressure reaction such as hydrogeneration, hydroforylation and carbonylation is completely impossible with these models. In addition, if low temperature is required for preparing chemical reagents followed by addition of the reagents to the deep wells, the aforenoted 96 deep-well plate format is not utilizably possible for such low temperature method operation.

Other design synthesizers such as those made by Bohdan Automation of Illinois of which the fixed 96 deep well plate are also used to conduct chemical synthesis. Similar problems as described above are likewise encountered with that/those synthesizer(s).

Because of the heretofore-continuing problems, lack of speed, efficiency, and reliability and inability to effectuate a sequential series of simultaneous reactions using the prior art, objects of this present invention include the following:

Objects of the present invention include a novel method and apparatus(es) embodying the same, for making possible the simultaneous production on a significant scale of increasingly larger numbers of different final reaction products derived from each of addition a plurality(ies) of sequentially divergent treatments/reactions with different fixed-reactant/liquid reactant mixture combinations.

Another particular object is to provide a novel apparatus enabling individualizing separate temperature control for, segregated subsequent reactions after following the initial reaction with the initial fixed-reactant/liquid reactant mixture combinations.

Another object is to provide for multiple sequential separate treatments of the each of segregated ones of prior treated teabags of beads while utilizing a common same treatment apparatus and/or vessel.

Broadly in its most generic form, the invention is an apparatus for and a method of physical chemistry utilizing a first porous teabag or a number of porous teabags. The teabags contain a first plurality of separate treated inert substrates. Each inert substrate is fixedly coated or impregnated with a common one or more beginning element(s) or first compound referred to herein as "fixed-reactant." Each inert substrate is sequentially subsequently further treatable by combining with liquid reactant mixtures e.g., solution(s) or suspension(s) of one or more first predetermined reactant (s). The steps include at-least the following two steps:

1. Concurrently thereafter first-subject at-least a second one of the first plurality—in its first porous teabag and concurrently also in at least a (one or more) second porous teabag, to first reactive contact (i.e. reaction) with at-least one second predetermined different reactant—i.e. a different reactant different from the first predetermined reactants(s). The different second predetermined reactant is as/in at least one liquid reactant mixture sufficiently to form a second plurality of a second compound(s). This embodiment of the method may also include shifting means to shift or change the combination of fixed-reactant/liquid reactant mixture, e.g. by mechanical means, as robotics, or by fluid flow means or combination thereof, e.g. with a common channeling of the second predetermined reactant from a common source to the different ones of the second plurality.

2. Also, thereafter concurrently second-subject segregated different ones of each of at least two of the second plurality of the second compound, to second reactive contact (i.e. reaction) with at-least one chemically different one(s) of different at-least third and fourth reactants. The third and fourth reactants are carried in at least one liquid reactant mixture liquid-vehicle sufficiently to form a fourth plurality of different at-least separate segregated third and fourth compounds.

Note that "liquid reactant mixture" may be solid reactant (s) in a liquid carrier, liquid reactants in a liquid carrier or combinations of liquid and solid reactants in a liquid carrier, creating solutions, suspensions, emulsions, etc. for reacting with the teabag fixed-reactants. The carriers may be solvents, diluents, combinations, etc.

In a first preferred embodiment, as an improvement on the generic invention described above, there is an additional step of thereafter subjecting segregated different ones of each of at least two of a fourth plurality of the second compound to a second reactive contact (i.e. reaction) with a chemically different one of different at least separate segregated fifth and sixth compounds, and controlling reaction temperature during the/that subjecting, sufficiently to significantly alter reaction of the second predetermined reactant with the first reactant as to obtain improved completeness of that reaction to substantially total (complete) reaction.

In a second preferred embodiment, as an improvement on the first preferred embodiment, the aforenoted controlling of reaction temperature includes heating and providing at least one of a solvent and diluent for at least one of a solution liquid-vehicle and a suspension liquid-vehicle of at least one second predetermined reactant during the first reactive contact (i.e. reaction). The heating includes heating at sufficiently elevated temperature(s) to significantly accelerate reaction of the second predetermined reactant with the first reactant for improved completeness of that accelerated reaction.

In a third preferred embodiment, as an improvement on the foregoing generic invention, there is included heating and providing at least one of a solvent and diluent for the at least one of a solution liquid-vehicle and a suspension liquid-vehicle of the second predetermined reactant during said second reactive contact (i.e. reaction), and including heating being sufficiently elevated in temperature to significantly accelerate reaction of the second predetermined reactant with the first predetermined reactant for improved completeness of total reaction.

In a fourth preferred embodiment, as an improvement on the first preferred embodiment, thereafter subject segregated different ones of each of at least two of a fourth plurality of the second compound to second reactive contact (i.e. reaction) with a chemically different one of different at least separate segregated fifth and sixth compounds.

In a fifth preferred embodiment, as an improvement on the fourth preferred embodiment, the controlling includes cooling and providing at least one of a solvent and diluent for the at least one of a solution liquid-vehicle and a suspension liquid-vehicle of the second predetermined reactant during the second reactive contact. The cooling is at a temperature sufficiently lowered as to significantly decelerate reaction of the second reactant with the first predetermined reactant for improved completeness of total reaction.

In a sixth preferred embodiment, as an improvement on the foregoing generic invention, there is included cooling and providing at least one of a solvent and diluent for the at least one of a solution liquid-vehicle and a suspension liquid-vehicle of the second predetermined reactant during the second reactive contact. The cooling is to sufficiently lower temperature(s) as to significantly decelerate reaction of the second reactant with the first predetermined reactant for improved completeness of total reaction.

In a seventh preferred embodiment, as an improvement on the fifth preferred embodiment, there is included employing a liquid-retainable vessel mountable within liquid-containable space thereof. The second predetermined reactant and the liquid containable vessel have an alternately adjustable valve adjustable between open and closed, for alternately retaining and draining liquid from the liquid-retainable vessel, and also for retaining the second predetermined reactant within said liquid-retainable space during each of the first-subjecting and the second-subjecting.

In an eighth preferred embodiment, as an improvement on aforenoted generic invention, there is included employing a liquid-retainable vessel mountable within liquid-containable space thereof the first predetermined reactant and the liquid containable vessel having an alternately adjustable valve adjustable between open and closed, for alternately retaining and draining liquid from the liquid-retainable vessel, and also for retaining the second predetermined reactant within the liquid-retainable space during each of the first subjecting and said second subjecting.

In a ninth preferred embodiment, as an improvement on the eight preferred embodiment, there is included intermittently supporting the "teabags" each containing a first plurality of separate treated inert substrates within the liquid-containable vessel during the first and second reactive contacts.

In a tenth preferred embodiment, as an improvement on the fourth preferred embodiment, there is included intermittently supporting the "tea bags" each containing a first plurality of separate treated inert substrates within the liquid-containable vessel during the first and second reactive contacts.

In an eleventh preferred embodiment, as an improvement on the fourth preferred embodiment, there in included employing a drainage outlet valve connected to and for intermittently opening and for intermittently closing the drainage outlet valve. The employing includes closing the outlet valve prior to and during supporting of said "teabags" within the liquid-containable vessel during the first and second reactive contacts, and thereafter opening the outlet valve subsequent to the first and second reactive contacts.

In a twelfth preferred embodiment, as an improvement on the ninth preferred embodiment, there is included employing a drainage outlet valve connected to and for intermittently opening and for intermittently closing the drainage outlet valve. The employing includes closing the outlet valve prior to and during supporting of said "teabags" within the liquid-containable vessel during the first and second reactive contacts, and thereafter opening the outlet valve subsequent to the first and second reactive contacts.

In a thirteenth preferred embodiment, as an improvement on the foregoing generic invention, there are included support structure means for intermittently supporting concurrently separate at-least first and second porous physical-chemistry tea bags each of which is supportable and intermittently mountable of first reactant impregnated or coated inert separate substrates. There further are included first structure providing for repositioning the first and second porous physical-chemistry teabags between separate alternate first and second positions. Thereby there is provided for separate distinctly sequentially different treatments of at-least the first and second porous solid phase physical-chemistry teabags' by subjection of each to at-least one of different separate second reactants.

In a fourteenth preferred embodiment, as an improvement on the twelfth preferred embodiment, there is included common liquid-channeling structure means for channeling a liquid common reactant from a common source concurrently to predetermined different ones of the segregated ones of at-least said first and second porous physical-chemistry teabags.

In a fifteenth preferred embodiment, as an improvement on the thirteenth preferred embodiment, there is included maintaining separately each of the first and second porous teabags, by a separation means.

In a sixteenth preferred embodiment, as an improvement on the eleventh preferred embodiment, there are included setting desired temperature by a temperature controlling means, for at-least one reactant of the physical-chemistry at-least first and second porous tea bags and also for thereafter measuring reaction temperature and thereafter responsively at-least one of heating and cooling reaction environment of a prior measured reaction temperature.

In a seventeenth preferred embodiment, as an improvement on the apparatus of the fifteenth preferred embodiment, there are included (by temperature controlling mechanism) setting a desired temperature setting for at-least one reactant the physical-chemistry at-least first and second porous teabags and also for thereafter measuring reaction temperature and thereafter responsively instituting (by appropriate mechanism) at-least one of heating and cooling of reaction environment of a prior measured reaction temperature.

In an eighteenth preferred embodiment, as an improvement on the fifteenth preferred embodiment, the common liquid-channeling structure includes an alternately adjustable valve means for adjustment between closed-flow and open-flow states thereof for alternately retaining and draining liquid from the liquid-retainable vessel.

In a nineteenth preferred embodiment, as an improvement on the fourteenth preferred embodiment, there is included a liquid-retainable vessel forming liquid retainable space therein. There is also included mounted on the liquid-retainable vessel for alternate closure and drainage of liquid therefrom, an alternately adjustable valve means adjustable between open and closed states, for alternately retaining and draining liquid from the liquid-retainable vessel, and for retaining the second predetermined reactant within the liquid retainable space during each of the first-subjecting and the second-subjecting.

In the twentieth preferred embodiment, as an improvement on the sixteenth preferred embodiment, there is included a liquid-retainable vessel forming liquid retainable space therein. There is also included mounted on the liquid retainable vessel for alternate closure and drainage of liquid therefrom, an alternately adjustable valve means adjustable between open and closed states, for alternately retaining and draining liquid from the liquid retainable vessel, and also for retaining the second predetermined reactant within the liquid retainable space during each of the first-subjecting and the second subjecting.

In the twenty-first preferred embodiment as an improvement on the broad generic method embodiment, there is additionally included vibrating the segregated different ones during at-least a portion of the second-subjecting.

In a twenty-second preferred embodiment on apparatus of the thirteenth preferred embodiment, additionally included is vibrating apparatus (and mechanism thereof) for vibrating the segregated different ones during at-least a portion of the second-subjecting.

In a twenty-third preferred embodiment on apparatus of the fifteenth embodiment, additionally included is vibrator apparatus (and mechanism thereof) for vibrating the segregated different ones during at-least a portion of the second-subjecting.

In a twenty-fourth preferred embodiment on the apparatus of the sixteenth preferred embodiment, additionally included is vibrator apparatus (and mechanism thereof) for vibrating the segregated different ones during at-least a portion of said second-subjecting.

In a twenty-fifth preferred embodiment on the apparatus of the seventeenth preferred embodiment, additionally included is a vibrator apparatus (and mechanism thereof) for vibrating the segregated different ones during at-least a portion of said second-subjecting.

In a twenty-sixth preferred embodiment on the apparatus of the eighteenth preferred embodiment, additionally included in a vibrator apparatus (and mechanism thereof) for vibrating said segregated different ones during at-least a portion of the second-subjecting.

In a twenty-seventh preferred embodiment on the apparatus of the nineteenth preferred embodiment, additionally included is a vibrator apparatus (and mechanism thereof) for vibrating said segregated different ones during at-least a portion of said second-subjecting.

Applicant relies on each of the foregoing preferred embodiments as each being patentable apart from other preferred embodiments and from the foregoing described broad generic invention.

Aforenoted sequential and simultaneous reaction synthesis of molecular core structures which contain branched positions for typically two substitutions on the core structures as shown in the foregoing reaction scheme provides novel apparatus(es) and a novel procedure(s)/method(s) for efficiently and economically and cost-conservative generating of large numbers of chemical compound-analogues within a shortened time and work schedule, utilizable of low cost equipment.

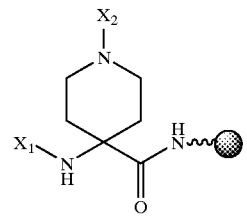

X1 = A, B, C, D, E
X2 = 1, 2, 3, 4, 5

The combination between the five elements within the aforenoted XI group and the five elements within the aforenoted X2 group would produce X1×(times) 2 to give a total of different final compounds. This means twenty five (25) different compounds of the composition for typically these particular arrays, may be produced, as symbolically shown below.

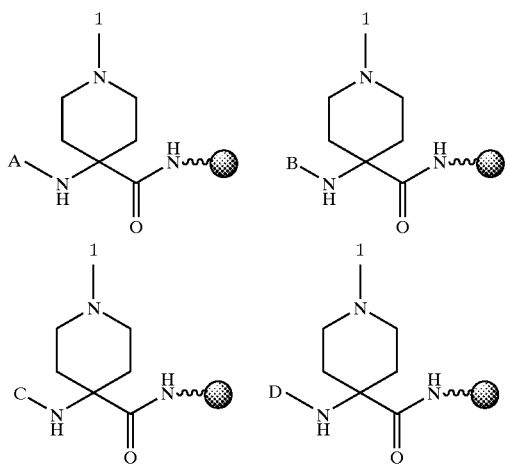

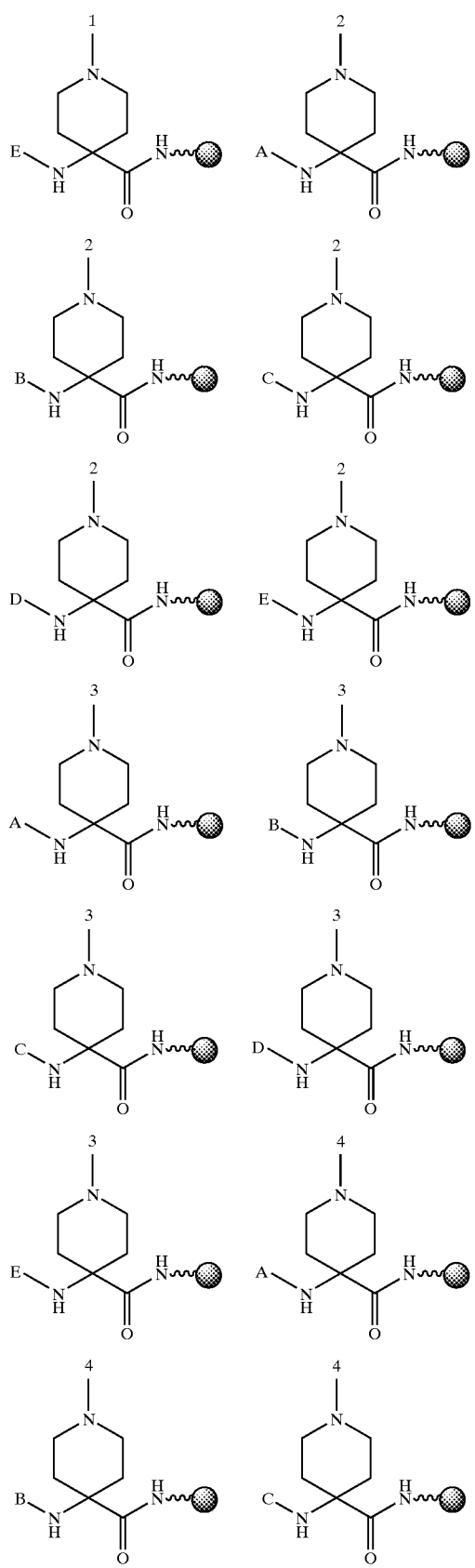
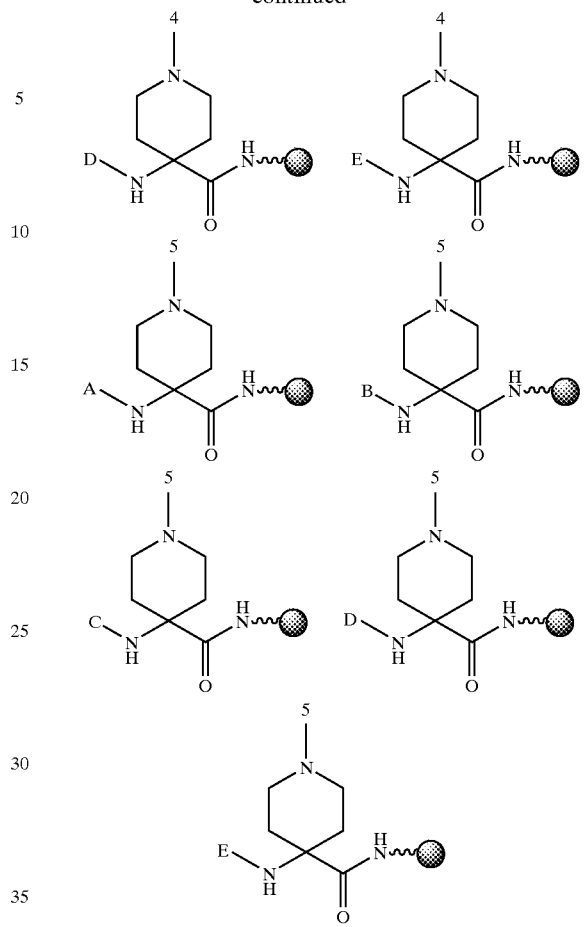

In heretofore prior practice, one needs to conduct twenty five synthetic experiments to prepare these twenty-five products. By heretofore prior practice, such task can be routine and yet heretofore has been time-consumingly laborious and accordingly highly expensive to accomplish, particularly in lieu of ever increasing costs of the work time of skilled laboratory technicians and/or chemists. Since, for example, solid phase chemistry has been used extensively to synthesize compounds in the labs, it is an object of this invention that an improved and enhanced method described for this invention, be utilizable to produce typically twenty-five products using a combinatorial approach, more preferably with the aid of automation which then further reduces the number of typically twenty-five operations to a nominal typical ten operations.

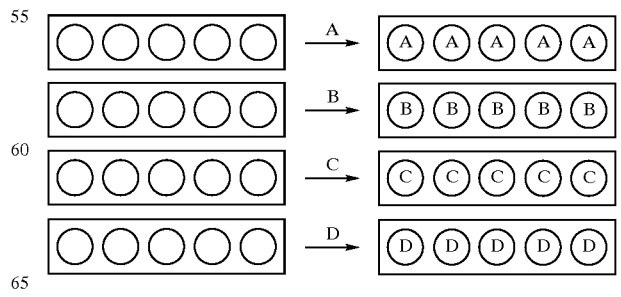

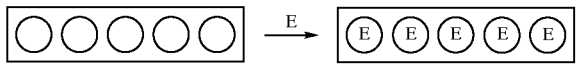

Typically, five reactors can be contained within one reaction bath. Accordingly, twenty five reactors would need five reaction baths. Each of these reaction baths is then treated with one particular (predetermined) reagent such as (symbolically) A or B or C or D or E. Thus, there are five groups of reactors each containing one covalently bonded reagent A or B or C or D or E.

Transposition using the present invention shifting means may be accomplished by mechanical movement means, dynamic fluid flow means or combinations thereof. Transposition of these twenty five reactors diagonally will give a new array (transformed arrangement) of the reactors as shown below:

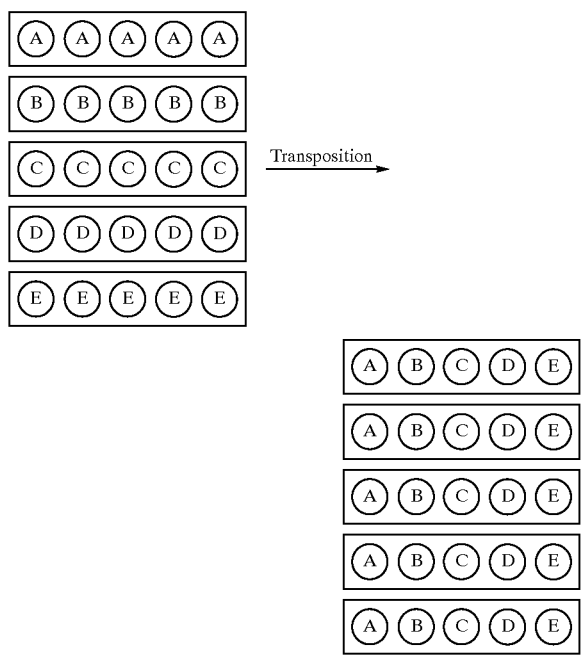

After the aforenoted transposition(s), the five reactors within each reaction bath now react with five new (additional) reagents, one per reaction, such as typically 1 or 2 or 3 or 4 or 5. Thus, these (typical) twenty-five reactors result in the production of twenty-five different products (as compared to one-another) as shown in the diagrammatic scheme herein below:

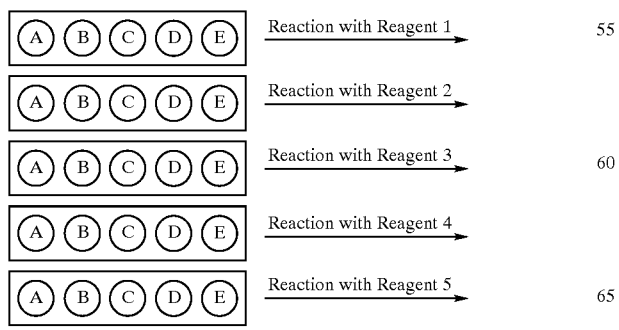

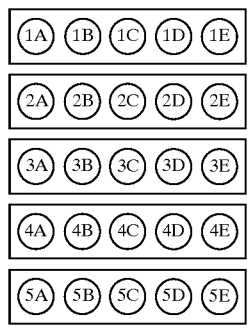

To further illustrate the concept, a reaction scheme/procedure using functionalized polymer to form a molecular core structure such as 1-alloc-4-fmoc-amino-4-carboxy-piperdine is described below. As typically illustrated in the symbolic reaction scheme below, both Fmoc and Alloc are protecting groups. This allows the coupling of reagents at the specific site where the protecting group is sequentially removed. In other words, the coupling of reagents can be accomplished orthogonally. The individual steps are illustrated symbolically hereinbelow. The reaction procedures are also described in the examples. Mechanical and/or dynamic fluid flow automated transposition method/procedure of rearranging reaction vessels, is also adaptable to the subsequent examples which clearly show the advantage of the present novel invention that allows the synthesis of the typically twenty-five products in a much more efficient, speedy, more economical cost-wise and productive manner, typically broadly symbolically represented as follows:

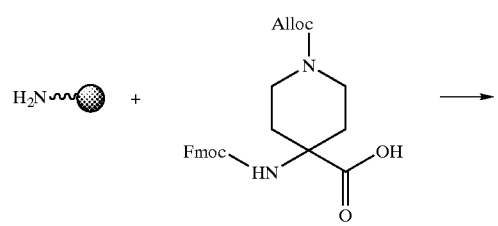

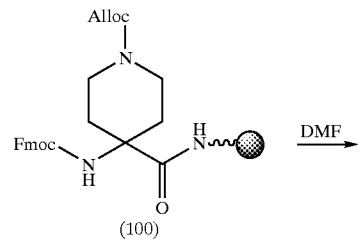

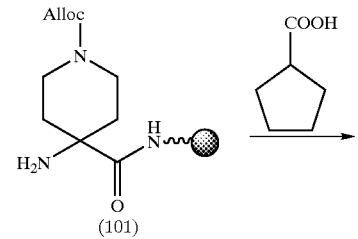

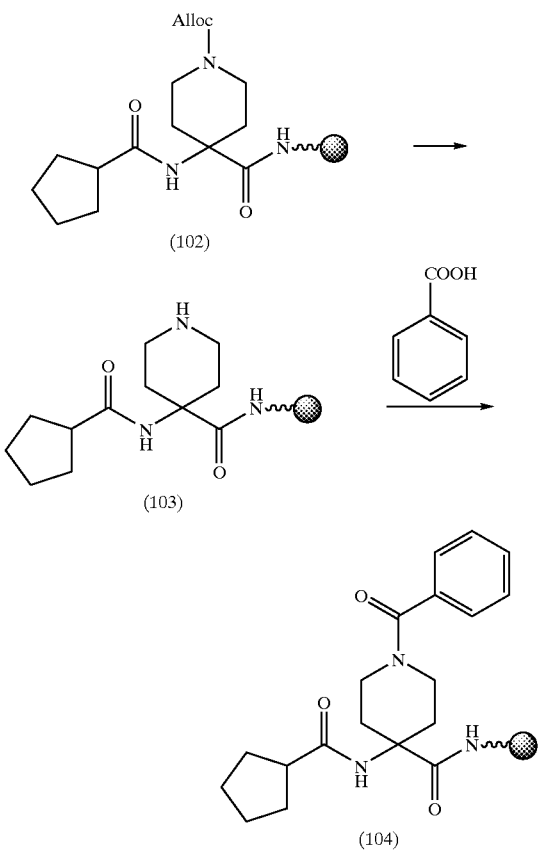

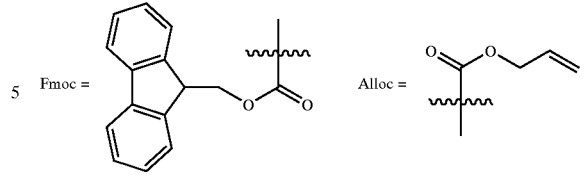

Typically a scintillation vial is charged 500 mg, of Rink resin (Amino group functionalized polystyrene polymer, loading factor 1.0 mmol/g, commercially available). To the resin is added 4 ml. of 1-methyl-2-pyrrollidinone and the resulting slurry is agitated typically on a conventional laboratory shaker for about ten minutes. To the slurry is thereupon additionally added 442 mg. of BOP (MW: 442) reagent. The slurry is again agitated for about ten minutes on typically a conventional shaker. Thereafter about three hours later, the slurry is thereupon filtered and washed about two times each with about 4 ml. Methylene chloride and 4 ml. Methanol, respectively. After being dried in a substantial vacuum, about 2 mg. of the resulting polymer product is thereupon tested, using typically in ninhydrin solution. The resin does not develop into blue color indicated the reaction to be complete. The product (aforenoted represented symbolically to be "(100)") contains/comprises polymer product, namely covalently bonded 1-alloc-4-fmoc-amino-4-carboxy-piperdine.

EXAMPLE 2

Deprotection of 1-alloc-fmoc (fluorentlmethyloxycarbonyl) from the Aforenoted Polymer "(100)", to Obtain Fmoc-Freed Resultant Product "(100)":

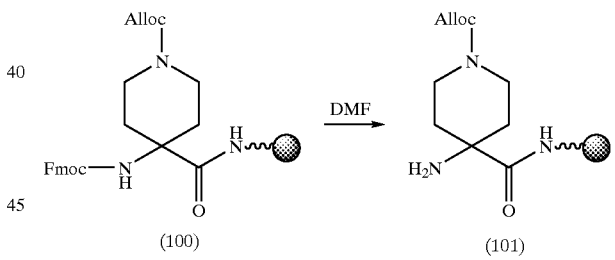

EXAMPLE 1

Synthesis of Polymer Supported 1-alloc-4-fmoc-amino-4-carboxypiperidine "(100)", Using Typically Well Known and Conventional Commercially Available Rink Resin (Polystyrene Supported Amino Group).

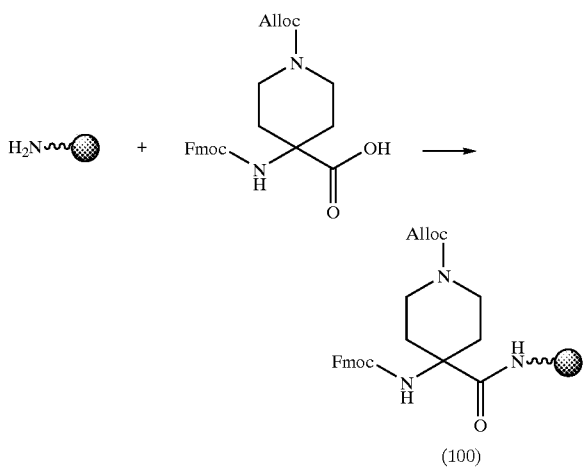

To the dried aforenoted 1-alloc-fmoc-containing polymer "(100)" is added about 4 ml. of about 20% piperidine in typically DML (dimethylformamide) followed by agitation on typically a shaker for about 30 minutes. The slurry is thereafter filtered and washed about two times each with about 4 ml. of typically methylene chloride and typically 4 ml. mthanol. After being dried in a substantial vacuum, about two mg. Of the now-treated aforenoted polymer "(101)" is tested using typically ninhydrin solution. When the resin develops into blue color, such indicates that fmoc has been deprotected (i.e., removed) to give the aforenoted the deprotected product "(101)".

EXAMPLE 3

Synthesis of 1-alloc-4-cyclopentyl
Carbonylamino-4-amido-1-alloxycarbonyl Piperdine (102), from the Aforenoted Deprotected Product "(101)":

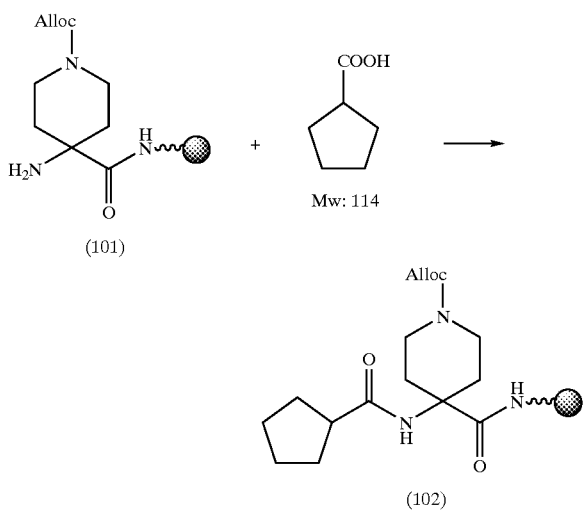

(101) + Mw: 114

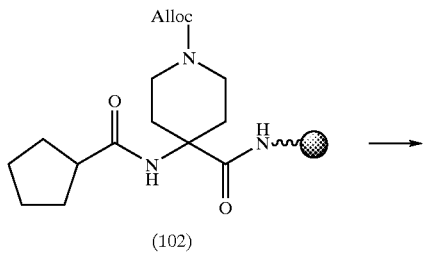

(102)

Into a sintilation vial, there is charged with about 114 mg. of 1-cyclopentyl carboxylic acid and about 442 mg. of BOP reagent. To this mixture is added about 5 ml. Of N-Methyl-pyrrolidinonone (NMP). The mixture is slowly dissolved after about ten minutes of agitation. To the solution is added about 200 ul of di-isopropyl-ethylamnine followed by agitation for about one minute. To the resultant solution is thereupon added about 500 mg of the aforenoted functionalized deprotected polymer product "(101)". The slurry is then agitated on typically a shaker. After about three hours, the slurry is filtered and washed about two times each with about 8 ml. of typically methylene chloride and about 8 ml. of typically methanol. After being thereafter dried typically in a substantial vacuum, about 2 mg. of the polymer "(102)" is tested using typically ninhydrin solution. When the resin does not develop into blue color, such indicates the reaction to be complete. The aforenoted polymer product "(102)" in the form of 1-alloc-4-cyclopentylcarbonyl-amino-4-carboxyamido-piperdine moiety still carried on the beaded Rink resin polymer.

EXAMPLE 4

Deprotection of 1-alloc-4-cyclopentylcarbonyl-amino-4-carboxyamido-piperdine Moiety "(102)" for its Allyloxycarbonyl (Alloc) Group to Secure (Obtain) a Resulting Freed 4-cyclopentyl carbonylamino-4-amido-1-allyoxycarbonyl Piperdine Product "(103)":

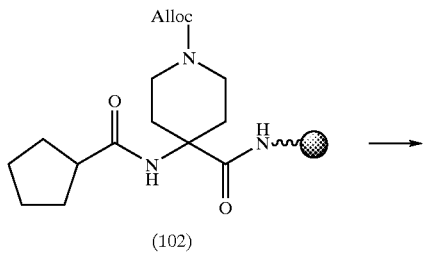

(102)

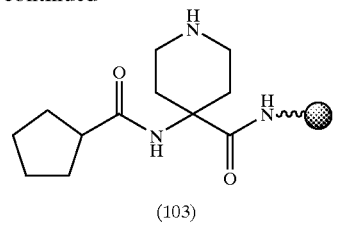

(103)

Typically a 50 ml. cylindirical glass vessel equipped with typically a coarse glass frit is charged with 4-cyclopentyl carbonylamino-4-amido-1-allyloxycarbonyl piperidine substituted Rink resin (500 mg.) obtained from Example 3 and a solution prepared from bis(triphenylphosphine) palladium dichloride (about 80 mg., about 0.11 mmol) and acetic acid (about 0.25 ml., 4.1 mmol) in dried methylene chloride (about 7.5 ml.), about 3.5 mmol. The mixture is agitated for about another one hour. To the mixture is added a portion of tri-n-butyl tin hydride (about 1 ml., about 3.5 mmol. Agitation continues for about another hour and the mixture is thereafter filtered. After the foregoing deprotection, the mixture is washed with dichloromethane (about 2×10 ml.), methanol (about 2×10 ml.) and dimethylformamide (about 2×10 ml.) to give (render) 4-cyclopentyl carbonylamino-4-amido-piperidine substituted on the Rink resin polymer bead(s), as product "(103)".

EXAMPLE 5

Synthesis of 4-cyclopentyl carbonylamino-4-amido-1-phenyhlcarbonyl-piperidine (104).

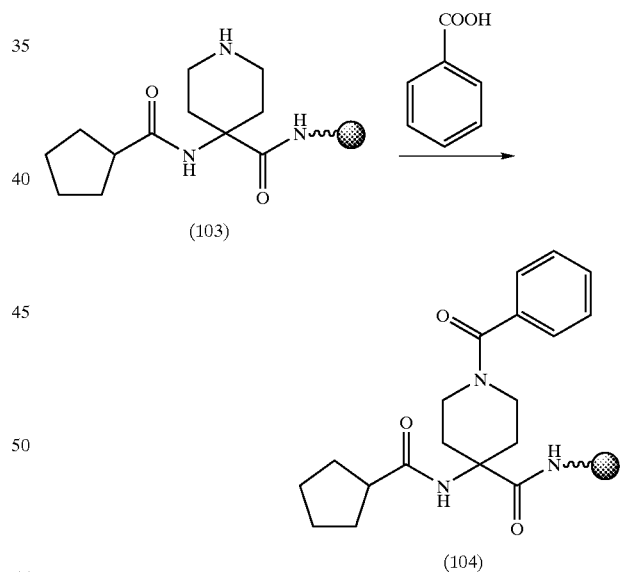

(103)

(104)

Typically a sintilation vial is charged with about 122 mg. of benzoic acid and 442 mg. of BOP reagent to form an admixture. To the mixture is added typically about 5 m. of N-methyl-pyrrolidinone (NMP). The mixture thereafter is slowly dissolved after/during about ten minutes of agitation thereof. To that solution there is added about 200 ul of di-isopropyl-ethylamine followed by agitation for about one minute. To that solution is thereafter added about 500 ul of 4-cyclopentyl carbonylamino-4-amido-piperidine substituted on the Rink resin polymer (i.e. aforenoted product) "(103)". Thereupon/thereafter the slurry is agitated on typically a shaker. After about 3 hours, the slurry is filtered and washed about two times each with about 9 ml. methylene chloride and about 8 ml. methanol. After being dried in a substantial vacuum, 1 mg. of the resulting polymer, is tested using ninhydrin solution. When the resin does not develop into blue color, such indicates that the reaction is complete. The product "(104)" contains 1-benzoyl-4-cyclopentylcarbonyl-amino-4-carboxyamido-piperidine substituted on the Rink resin-polymer bead(s).

EXAMPLE 6

Cleavage of the Product "(104)" from the Aforenoted Rink Resin Polymer Bead(s).

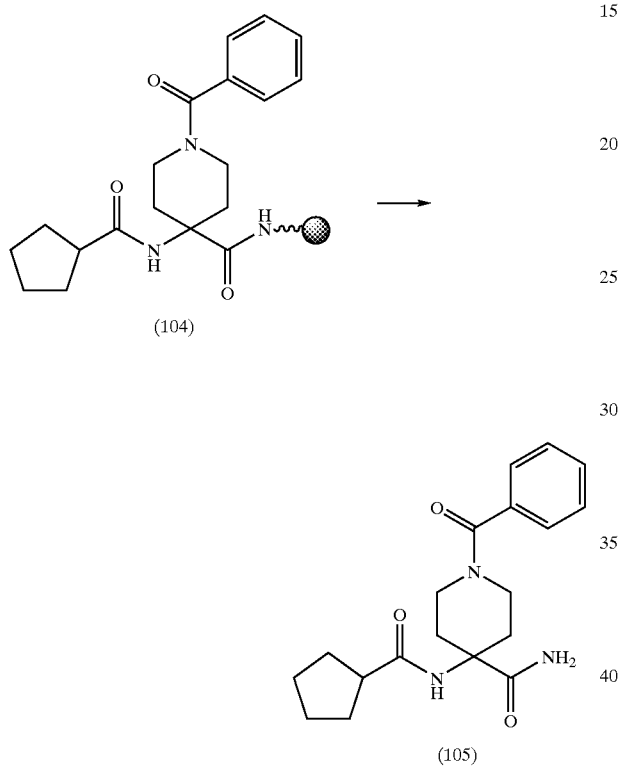

Weigh about 500 mg. of the aforenoted substituted polymer "(104)" and charge it into a scintillation vial (or the like). To the residue, there is added about 7 ml. of about one to one mixture of trifluoro acetic acid in methylene chloride. Thereafter the resin is agitated for about one hour. The resulting slurry is filtered and the filtrate is collected and put under a substantial vacuum until it becomes (forms) a substantially dried residue. Approximately (about) 20 ml. of diethyl ether is thereupon added thereto and admixed sufficiently to form a mixture, and thereafter the mixture is allowed to stand for about four hours. The ether is removed such that the product 1-benzoyl-4-cyclopentylcarbonyl-amino-4-carboxyamido-piperidine is obtained as product "(5)".

To demonstrate the use of the invented automated synthesizer in preparing large numbers of analogues, an example is described below showing how typically the twenty five compounds can be produced.

In the product array(s) described before, five different reagents A, B, C, D and E and five different reagents 1, 2, 3, 4, and 5 respectively may be utilized, illustrated in the following examples below. Combinations of the two sets of reagents will hereinafter be explained. The synthetic procedures are similar to the foregoing Examples A through 6.

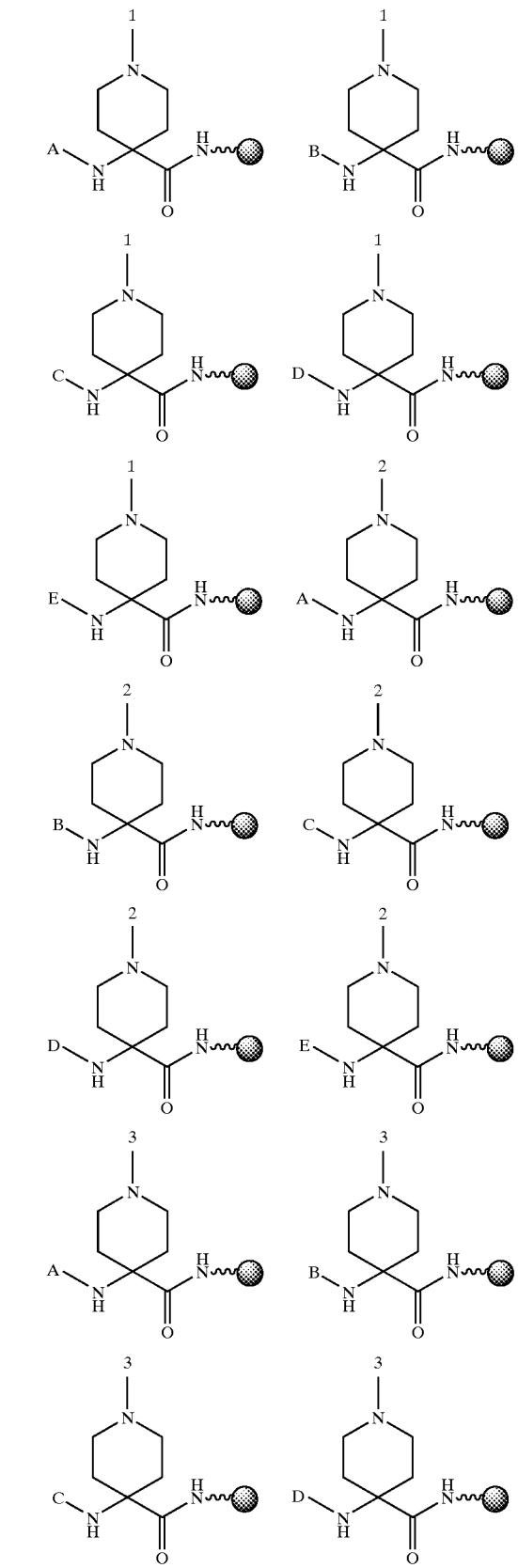

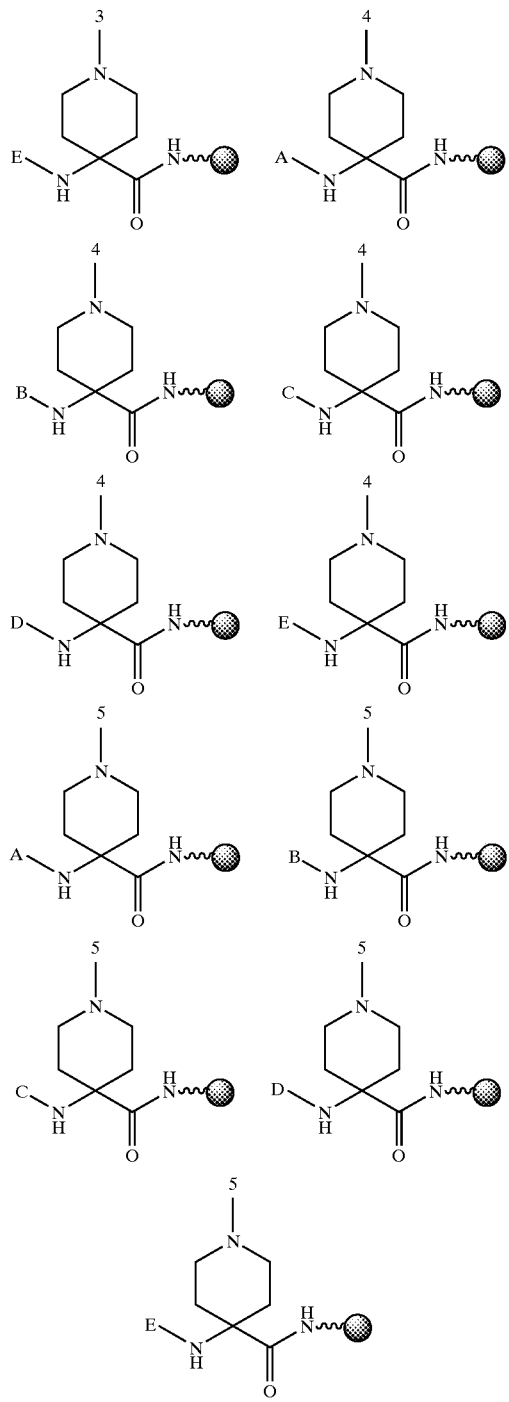
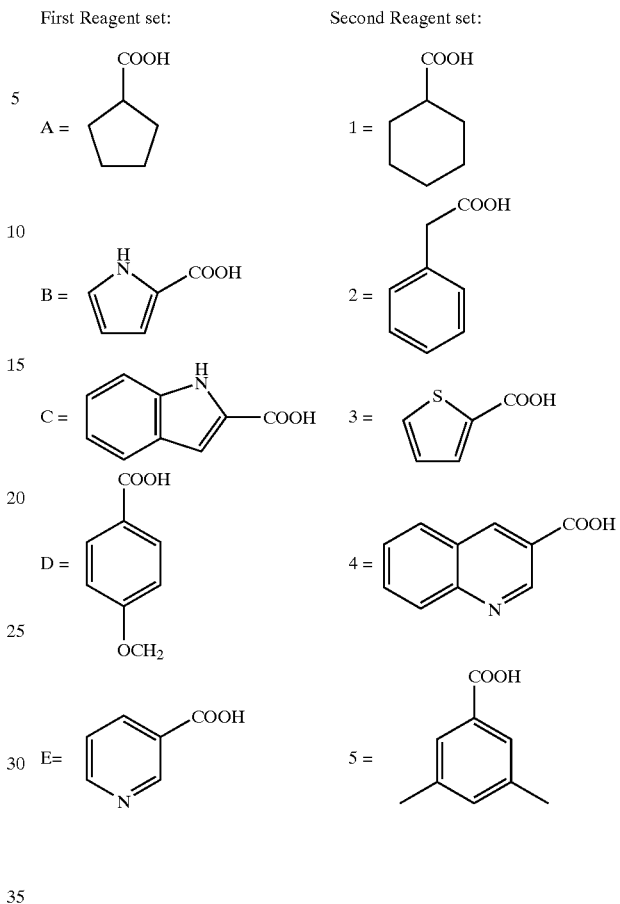
Five reactors are organized in one reaction bath as diagrammatically shown in the below following scheme. Five reaction bathes in total contain five reactors.
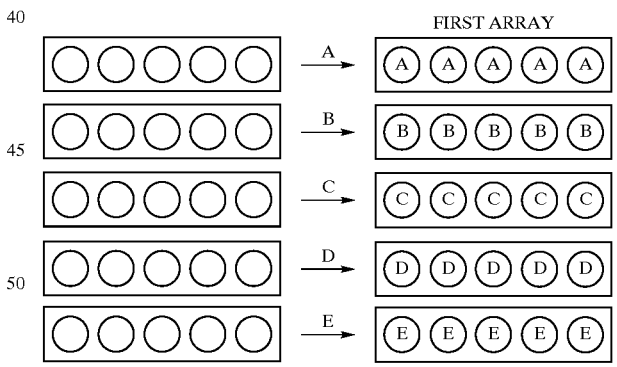
Wherein:
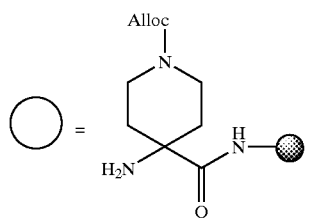
EXAMPLE 7
Combinatorial Solid Phase Synthesis of 1,4,4-trisubstituted Piperidine Analogues Using the Synthesizer Method and Structures of This Invention are Typically as Follows:

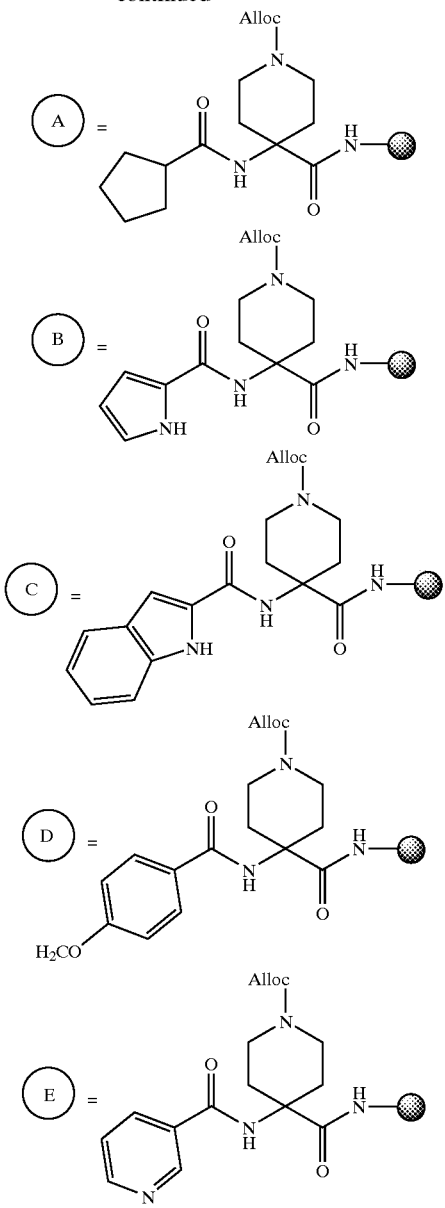

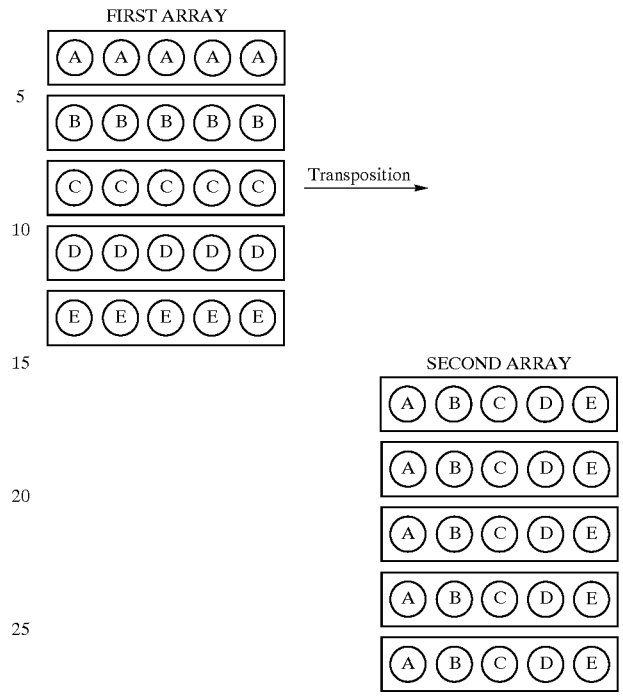

Coupling reactions are conducted with new reagents 1, 2, 3, 4, and 5 in each reaction bath. After the reactions, twenty-five new products are then synthesized where the structures of the twenty-five compounds are indicated in the scheme below:

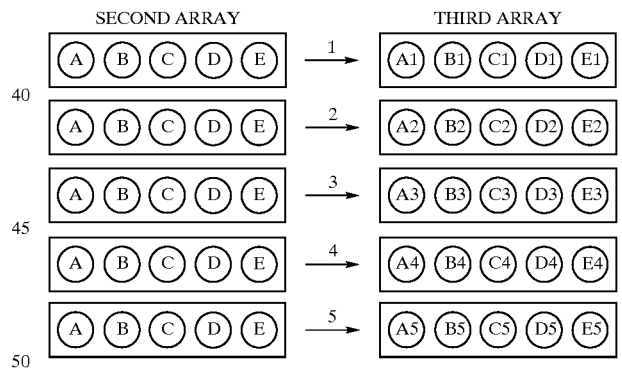

Solid phase synthesis with the five reagents as indicated as A, B, C, D and E is conducted with the equipment (or the like) disclosed herein—preferably with an automated synthesizer. After the coupling reactions, the substituted moieties are shown according to the symbols. The coupling reaction conditions are similar to what is described in foregoing Example 3.

Deprotection of the Alloc groups using a method or procedure typically similar or equivalent to that of Example 4 (or the like) renders free amino function which can be used for the next coupling reactions. Transposition of the typically five reactors within the matrix may be manual or aided by a preferred shifting means to give a new array of reactors ready for another round of coupling reactions with the five new reagents 1, 2, 3, 4 and 5.

The products in the first array are:

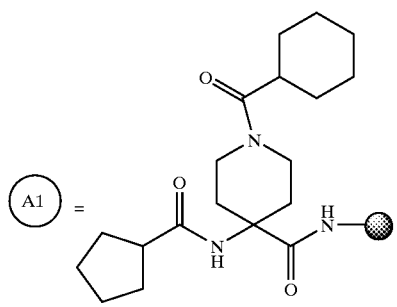

-continued
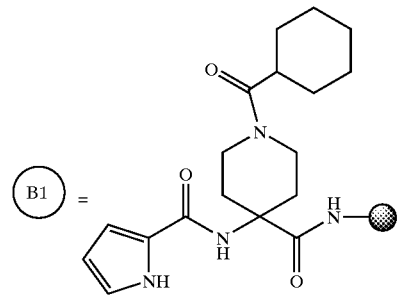
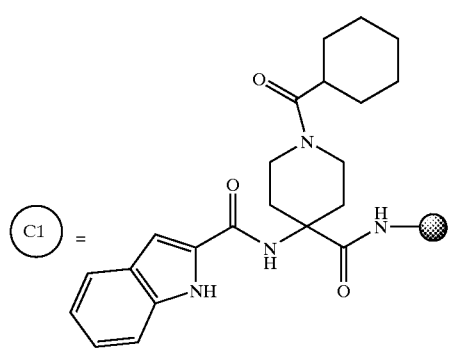
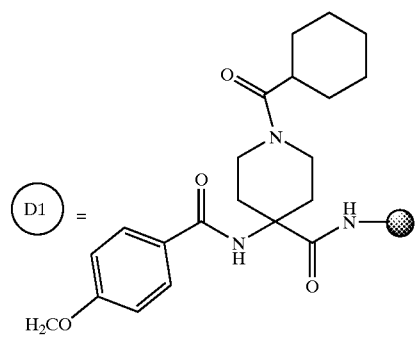
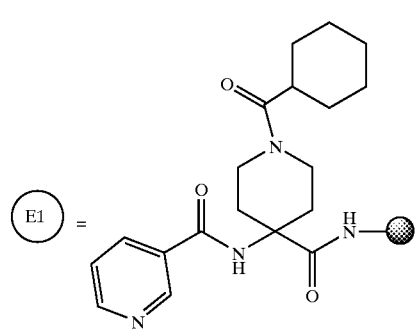
The products of the next-occurring second array would be:
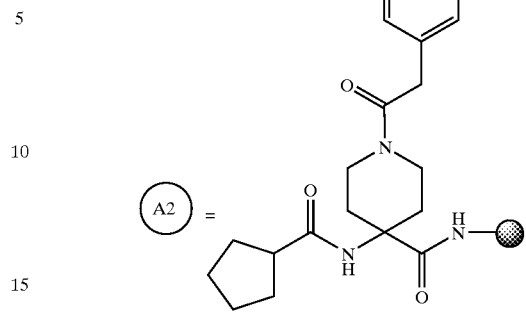
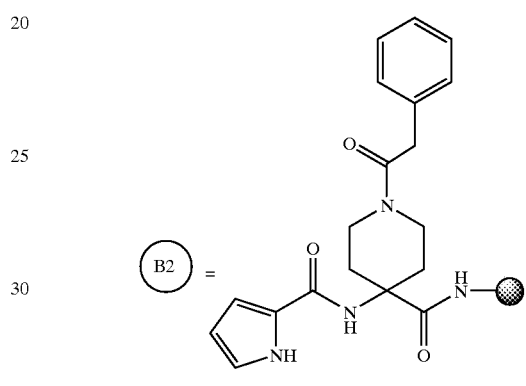
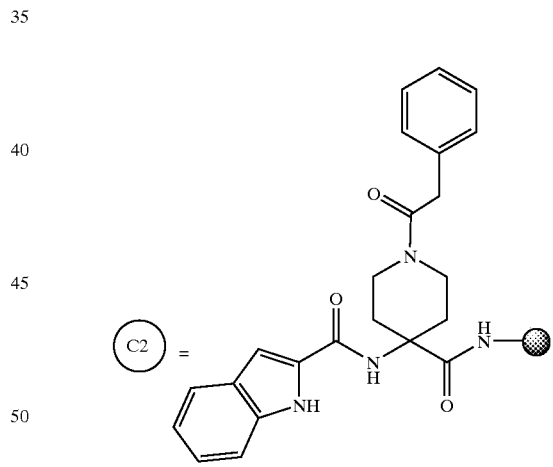
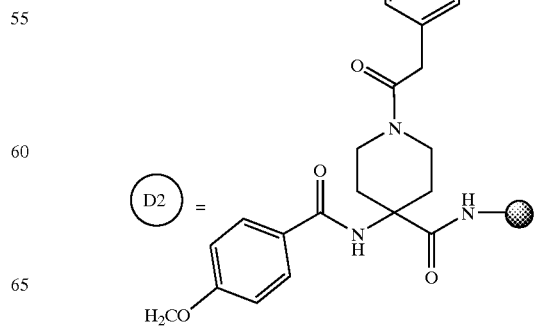

E2 = 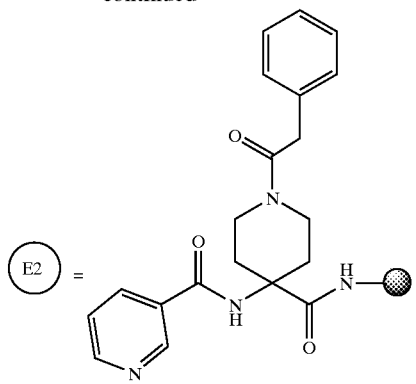
The products of the next-occurring third array would be:
E3 = 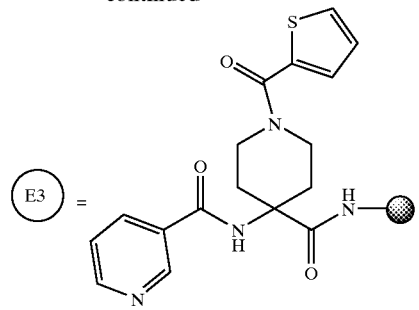
The products of the next-occurring fourth array would be:
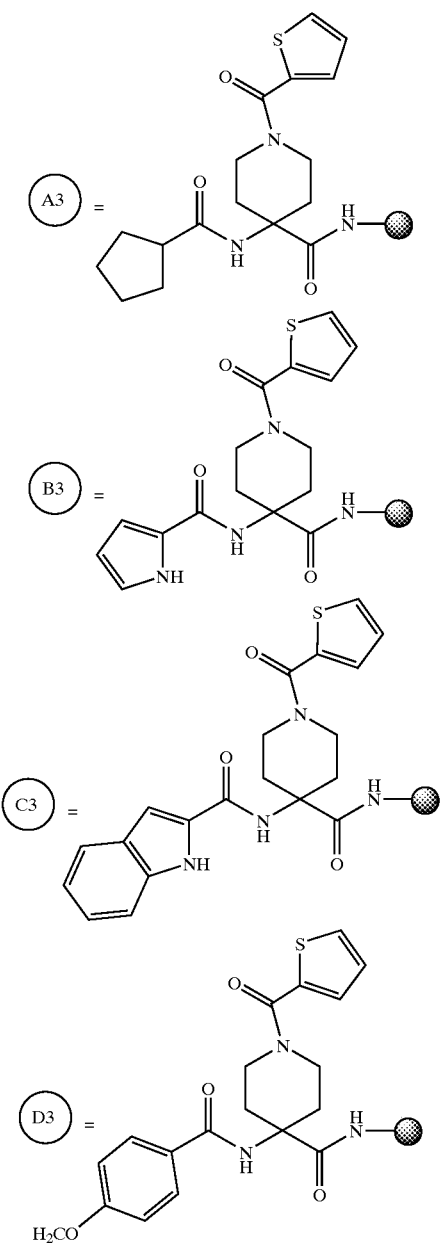
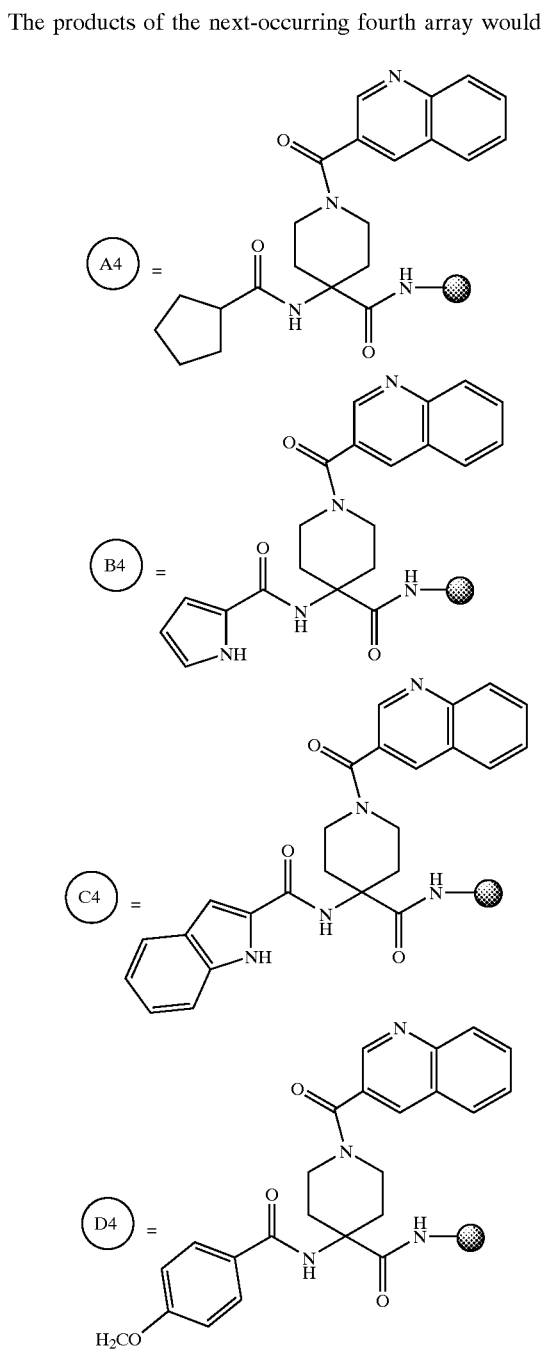

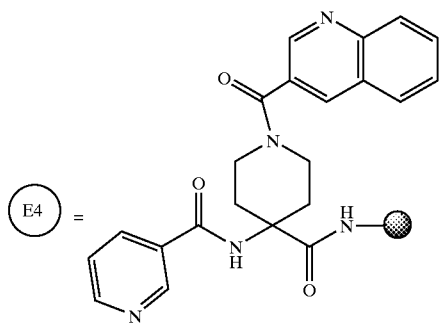

Thereafter, products of a next-occurring fifth array are:

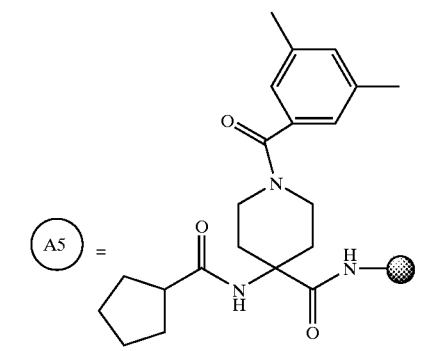

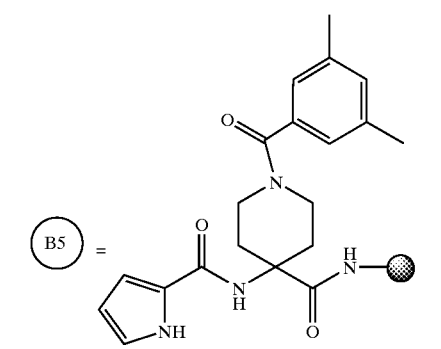

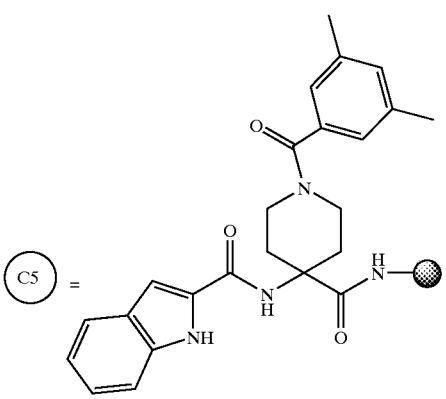

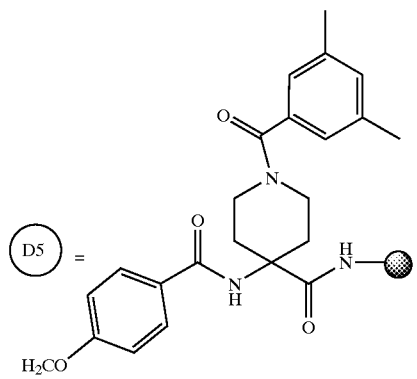

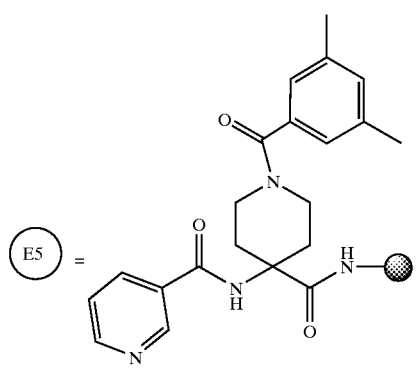

Accordingly, the foregoing twenty-five created analogues/products are synthesizable very efficiently and speedily and economically.

Accordingly, using conventional prior art conventional solid reactions and reactants, typically each bead one or more teabags of aforenoted typical conventional resinous polymer beads is/are coupled with a reagent that after the coupling-reaction provides the reactant-basis for further future additional reaction(s) via available functional groups—typically aforenoted and/or such as any one or more of an amino-group substituent (—NH2), (—OH) or the like—designated-hereinafter (arbitrarily) as SR (surface-mounted functional-group reactant). To obtain a plurality of separated ones of two or more (such as typically five [5]) identical substituted bead-mounted compounds, merely a plurality of beads are employed in a commonly housed teabag—arbitrarily designated 2(+) of 2(+) in a concurrent treatment and reaction with organic reactant to obtain a plurality of beads, each bead carrying a bead-mounted 2(+)SR1 compound. Thereafter, if one or more (a plurality) of the 2(+)SR1 bead-compounds (or separate bags thereof)—arbitrarily represented by 5 (as the plurality) i.e. 5+SR, are concurrently re-treated [further reacted] with a common reactant R2, the entire plurality, i.e. all, further-reacted bead-compounds will be again identical to one-another (the same final compound on every and all beads, i.e. 2(+)SR1/SR2; the total compounds is "still at" (i.e., remains at) a same grand total of the same 2(+) different final compounds! If the "2(+)" is five, then each of aforenoted 2(+)SR1 and 2(+)SR1/SR2 are still each solely and merely "five" in total number of the last reacted final products still all bead-mounted. Such represents the state of the prior art in this field of solid state production of new teabag chemical compounds—comparable to doing a single same synthesis five consecutive separate times. To expand to new compounds, before reaction with different reactants to product "different" compounds, per the prior art disadvantage, all reacted-beads must be "separated" (from one-another) after the common reaction(s) thereof, before proceeding to isolated different treatments for differently each of the separated reacted beads. Such prior art procedure requires the aforestated disadvantage of expensive time-consuming separation of and remounting/repackaging of the separated beads in (into) other separate teabags, of the separated beads.

In the present invention, preferably utilizing a specially designed equipment, physically separated but preferable commonly mounted teabags (and the previously first-reacted compounds thereof) are initially rearranged from typically five physically separated rows of physically separated five bead(s) (each row having been reacted with different reactant(s)—different from the first reactant and different from each other), which total at twenty-five different compounds when concurrently (simultaneously) each thereof reacted with different second reactant; the new orientation is for example, at about a right-angle (about 90 degree adjusted orientation relative to the original arrangement) reorientation. At the same position, these compounds may be further reacted with other common or different third reactants, or alternative may first be rearranged (repositioned) to the initial first position-orientation, followed by treatment with a third reactant compound—the same for all positions or alternatively with a different third reactant compound for the five different positions/rows of preexisting different compound. By this available manipulation and concurrent treatments, devoid of heretofore required time-consuming and laborious separation of individual beads, etc., economically inexhaustible large numbers of new and different compounds may be economically and speedily produced by this novel invention.

More broadly, the invention deals with a dynamic matrix system for synthesizing a large number of chemical compounds in typically parallel. The matrix typically as a method and apparatus for implementing the same, includes a plurality of tube sets, each set containing a series of bottom filtered reaction tubes, each tube containing reaction elements (i.e. mounted reactant) on a typically solid support(s) (i.e. the teabag beads-coatable substrates.) All of the tube set are typically placed simultaneously/concurrently into a common reactor structure or vessel, utilizing a different reactor structure for each tube set. If the tube sets are visualized as arranged in racks and the racks are arranged in rows, it can be seen that when by this invention the rows are transposed into columns, each of the compounds in each tube set will be positioned to react with different reactor but still simultaneously. Where typically there is an X number of different X-set tubes and is a Y number of different Y-set tubes, then the total number of separate reaction-procedures per inclusive treatment equals X+Y, while the number of "different" new compounds produced is X times [x] Y. If each of X and Y is 5, the total of 10 first-treatment/total reaction-procedures result in production of twenty-five distinctly different potentially separate and separated new compounds.

Figure 11:
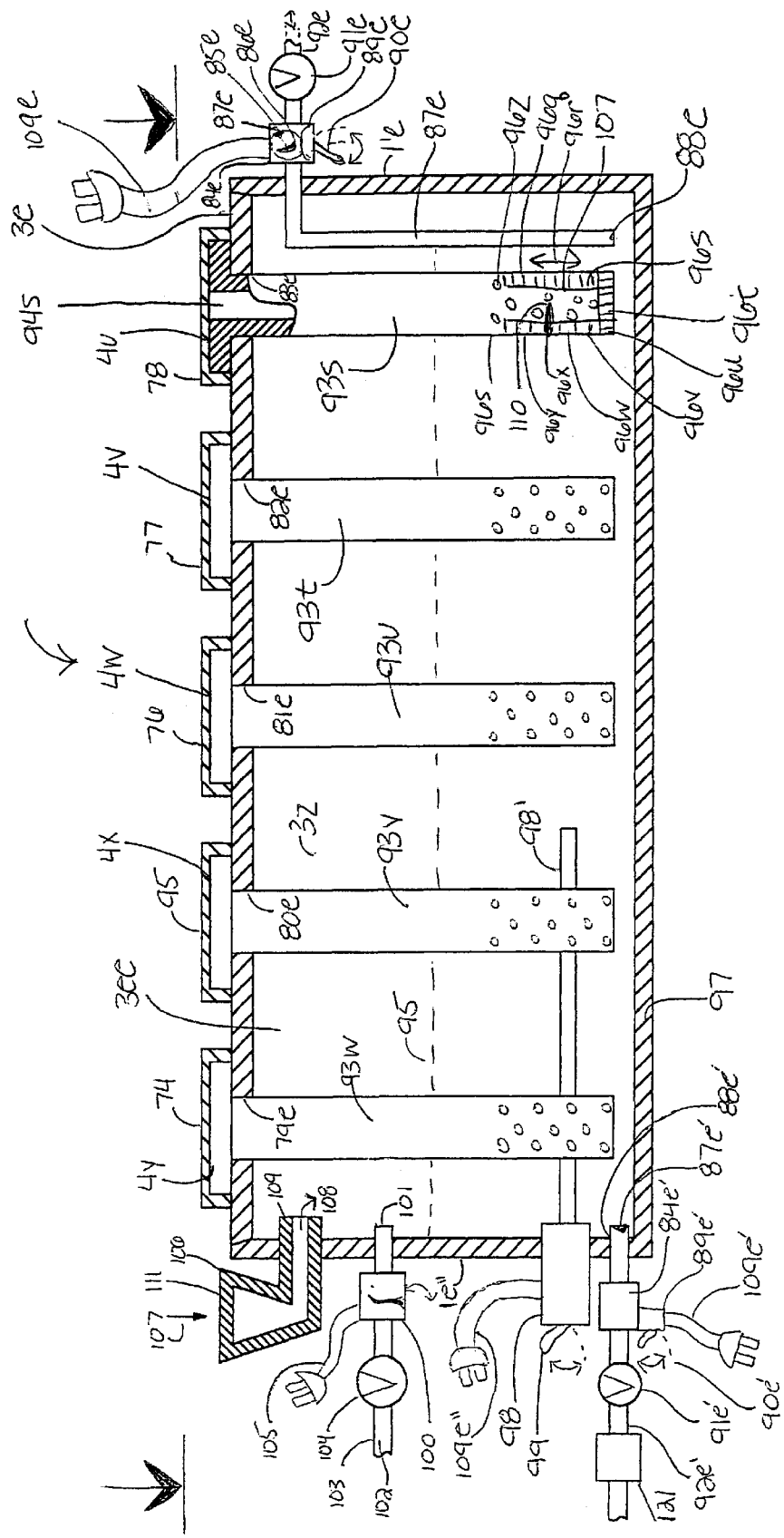
FIG. 11 symbolically and diagrammatically represents a side cross-sectional view of a reagent liquid-containable vessel-like apparatus of this invention, mounting separate teabags within common reagent-flow and treatment space, with integrated temperature and reagent-addition and removal mechanisms.

FIG. 1 symbolically and diagrammatically represents a typical embodiment of a unitary support so-called reactor-vessel structure 1 including vessel-mounted elements to be later described, the reactor vessel structure mounting within separate containers-defining structure the isolated separate holes (or vessel openings) 2a through 2e (through vessel [or indented] space) of multiple other separate and typically removable smaller-sized supports 3a through 3e each of which supports multiple rows. The structure 1 is such that each of the holes (or vessel top openings). The multiple smaller-sized supports 3a through 3e each and all typically removable-mounted tops to separate vessel-spaces 3aa, 3bb, 3cc, 3dd and 3ee formed by partitioning walls, such as walls 3w, 3x, 3y, and 3z, supporting the vessel top supports 3a through 3e, therebeneath are the separate (isolated) reactant-containable separate isolated reaction liquid-flow spaces 3aa, 3bb, 3cc, 3dd, and 3ee. The supports 3a through 3e typically support the respective teabag vessels 4a through 4y and their respective solid-physics bead-supporting flow-through teabags such as broadly-speaking 5a, 5b, 5c, 5d and 5e. In this illustrated embodiment, reactant flow-space through each of the teabags 4a through 4e are separate and isolated from other flow-spaces of teabags 4g through 4j and flow-spaces of teabags of 4"1" through 4"o", and flow-spaces of 4p through 4t, and of flow-spaces 4v through 4y, and all teabags within each of these separately flow-isolated spaces share a common flow-through reactant. In this particular embodiment here illustrated each of vessels 4a through 4y inclusive are separate teabags in the support through-space holes (such as FIG. 11 through-space holes formed by hole-forming typical structure(s) 79, 80, 81, 82, and 83, for example); these hole-forming structures (such as 79 through 83 support typically five separately supported liquid pervious teabags such as 4u, 4v, 4w, 4x, 4y and 4z. Each such teabags has typically mounted thereon one of the FIG. 11 caps, i.e. here represented as caps 55 through 79. The vessel-top supports 3a, 3bs, each of the five vessels contain a teabag structure containing typically a plurality of beads each having on the surface thereof a solid state bead-mounted reactant such as 4a through 4e. Thereafter one of the typically five different initial liquid reactants A, B, C, D and E—one for each of a different teabag, will be reacted with a solid-phase bead-mounted reactant—all of which is this First Array 6 are subjected to the same liquid reactant A designated 7 (i.e., Roman numeral "I") for each of teabags 4a through 4e. Thus the reactant array rows for the initial liquid reactants A, B, C, and D are shown generally in FIG. 1 as 8RA, 9RB, 10RC, 11RD, and 12RE. Likewise all of teabags 4f through 4j (all designated Roman Numeral II) are within liquid channeling for treatment solely by liquid reactant 9 (i.e. B). Likewise teabags 4k through 4"o" (all designated Roman Numeral III) are within liquid channeling for treatment solely by liquid reactant 10 (i.e. C). Likewise teabags 4p through 4t (all designated Roman Numeral IV) are within liquid channeling for treatment solely by liquid reactant 11 (i.e.D). Likewise teabags 4v through 4y (all designated Roman Numeral V) are within liquid channeling for treatment solely by liquid reactant 12 (i.e. E). Also there is free-space air or other predetermined cloaking gas located above the reaction liquid either the same or different for the several separate isolated reaction liquid-flow spaces 3aa, 3bb, 3cc, 3dd, and 3ee. Also as illustrated more fully in FIG. 11, are the reversible liquid conduits and pumps and also the inert-gas addition and other mechanisms. Indicia 84a through 84n and 84p illustrate pump on-off switches controlling alternate open-closed valves 34a through 34e and 85a through 85e.

FIG. 2 symbolically and diagrammatically represents the same reactor unitary support structure aforenoted of FIG. 1 with some of the features which are identical to FIG. 1 being identically numbered (also factually including but in this illustration not redundantly here again illustrating the various vessel-mounted elements), the appearance thereof in this illustration being stepwise (procedurally) after (subsequent to) the, for example achieved robotically or dynamically with fluid flow, reshifting of the separate rows within the reactor 1 into different ones of the five separately supported pervious teabag vessels, in effect changing the array from an x-axis orientation to a y-axis orientation geometrically speaking in their respective mounting supports mounted within the reactor vessel. Reagent identifications 14 through 18 need no new designation as there are none.

Figure 3:
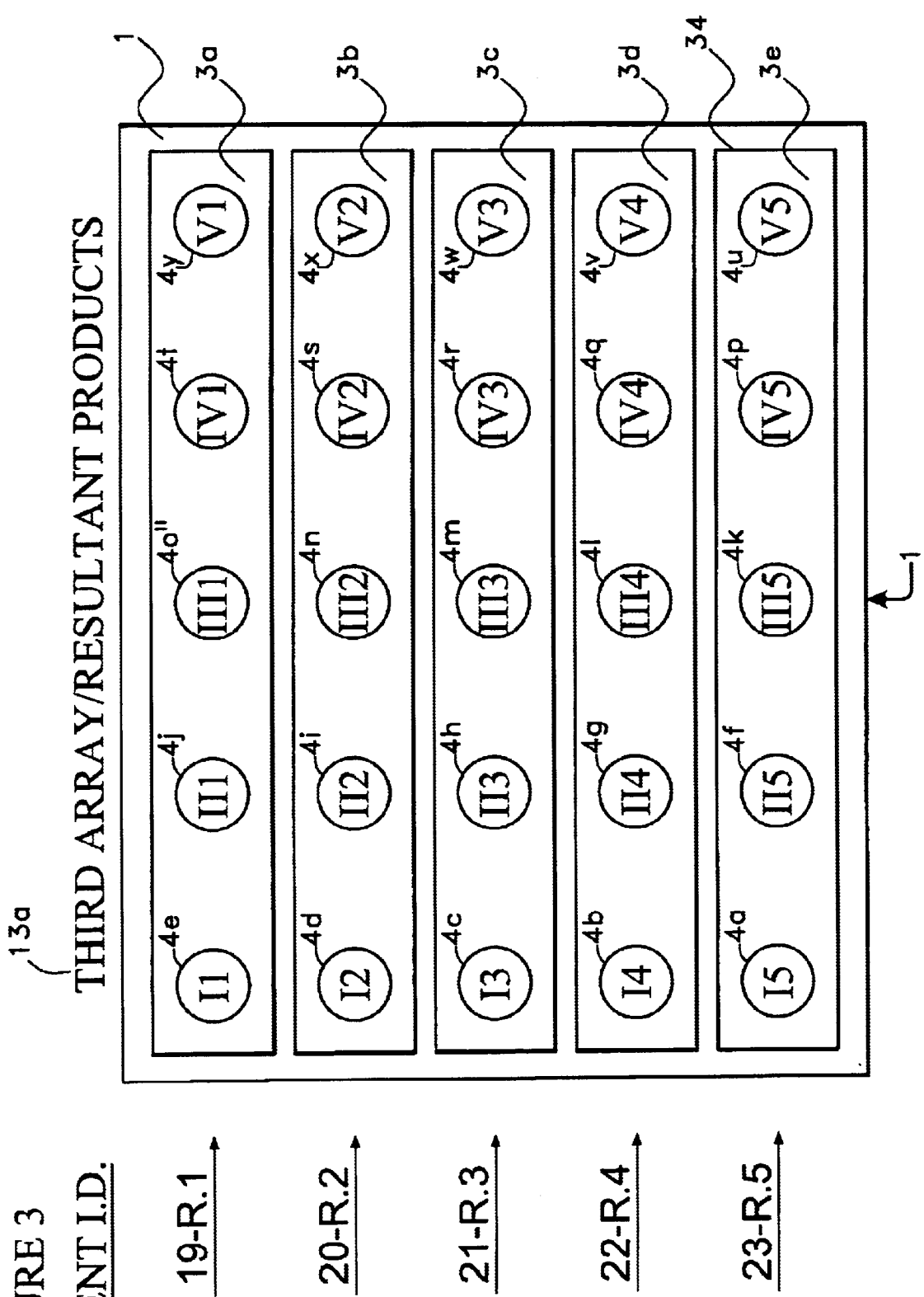
FIG. 3 symbolically and diagrammatically represents typically the same reactor unitary support structure aforenoted of FIG. 2 in the same "second array", illustrating the diagrammatic composition and positions of the newly formed compounds (such as I-1, II-1, . . . I-2, . . . V-2, etc.) after the compounds of FIG. 2 for each of their respective positions, were reacted each with a different additional one of different reagents 1 through 5 to form new compounds I1 through V5.

FIG. 3 symbolically and diagrammatically represents typically the same reactor unitary support structure. aforenoted of FIGS. 1 and 2 (also factually including but in this illustration not redundantly here again illustrating the various vessel-mounted elements), the appearance thereof in this illustration being stepwise (procedurally), illustrating the diagrammatic composition and positions of the newly formed compounds when the compounds of FIG. 2 for each of their respective positions, were reacted each with a different one of different reagents a, b, c, d, and e respectfully. Here, reagent identifications 19 through 23 are shown as R1, R2, R3, R4 and R5.

Figure 4:
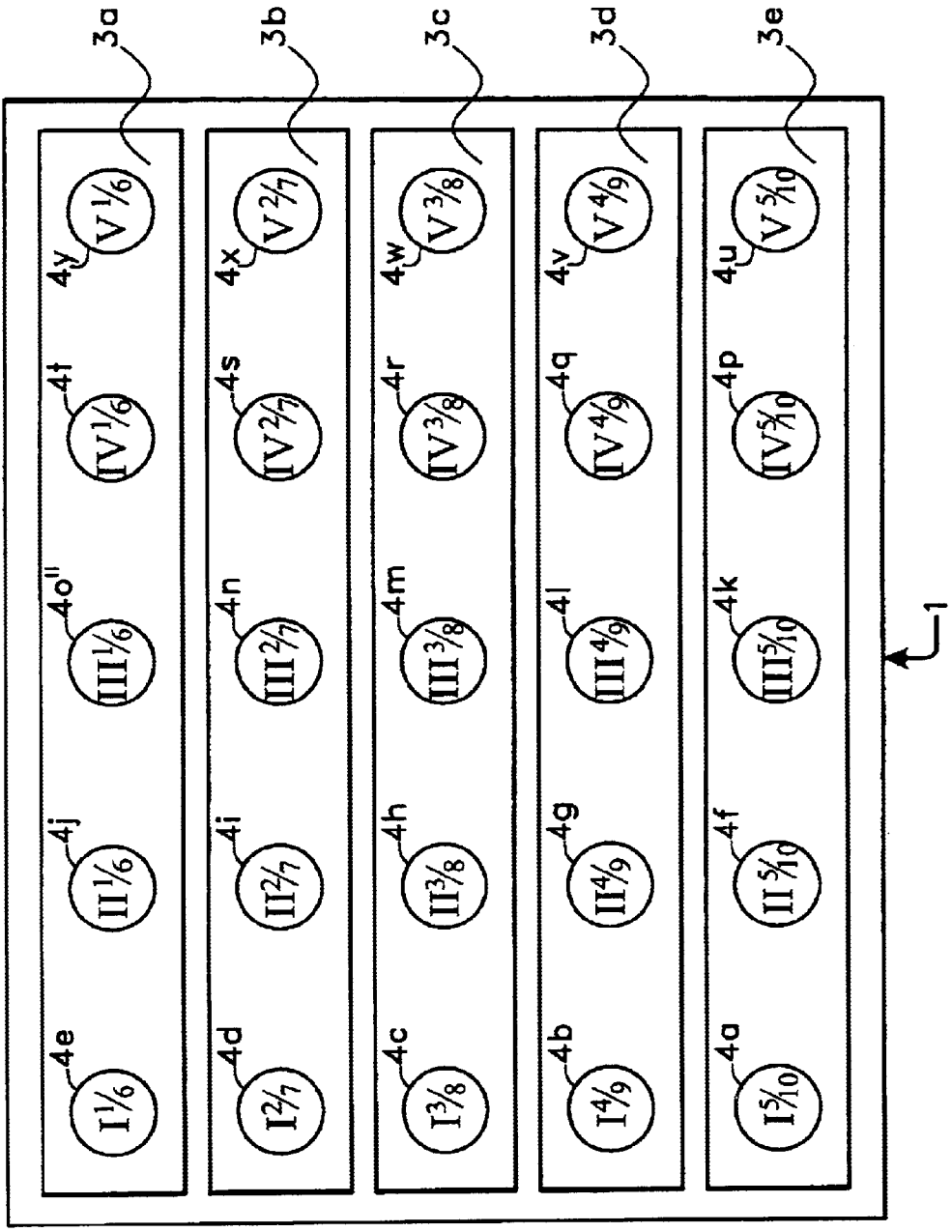
FIG. 4 symbolically and diagrammatically represents typically the same reactor unitary support structure aforenoted of FIG. 1, the appearance of the next-occurring rearrangement from that of FIG. 3, prior to the next cycle of typical reactions with next separate reactants 6 through 10 therewith individually to form typically for reactant 6 (corresponding to Example 7 reactant piperidine[hexahydropyridine]) forming the resultant product I6 (corresponding to the Example 7 resultant intermediate piperidine-analogue)

FIG. 4 symbolically and diagrammatically represents the appearance of the next-occurring arrangement from that of FIG. 3 (also factually including but in this illustration not redundantly here again illustrating the various vessel-mounted elements), the appearance thereof in this illustration being stepwise (procedurally), prior to the next cycle of typical reactions with next separate reactants 6, 7, 8, 9, and 10. Here, reagent identifications 24 through 28 are shown as R6, R7, R8, R9 and R10.

Figure 5:
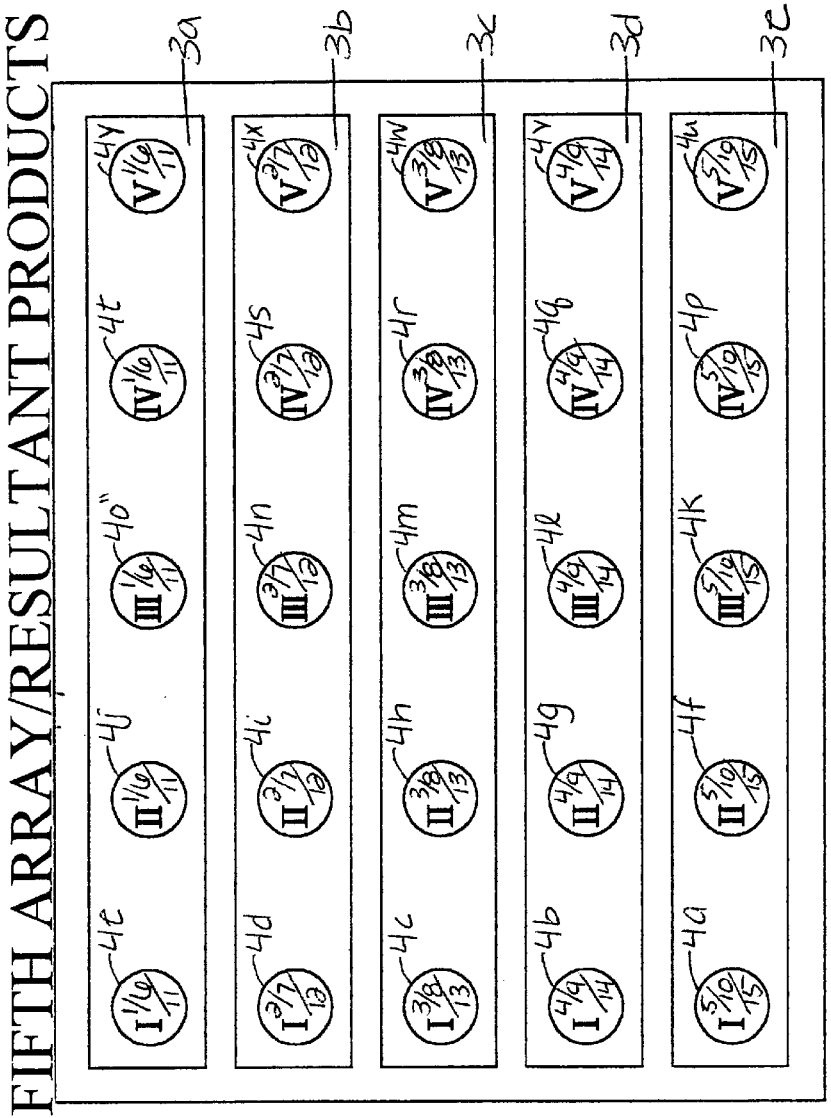
FIG. 5 symbolically and diagrammatically represents typically the same reactor unitary support structure aforenoted of FIG. 1, the appearance of the foregoing FIG. 4 illustration as to specific compounds newly formed following the aforenoted next-occurring rearrangement, following reaction of each thereof with the various prior compounds shown in FIG. 3, this next cycle being each with different one of the next separate reactants 11 through 15 (such as FIG. 8 reactant aliphatic acid-substituted benzyl ring compound) to form more potentially new compounds III11 through V 15 (such as the FIG. 8 resultant compound C/ENALAPRIL)—obviously not a new compound but being compound and variations thereon in great (large) numbers producible by the novel apparatuses(s) the method (s) of this invention.

FIG. 5 symbolically and diagrammatically represents the appearance of the foregoing FIG. 4 (also factually including but in this illustration not redundantly here again illustrating the various vessel-mounted elements), the appearance thereof in this illustration being stepwise (procedurally) illustrating as to specific compounds newly formed following the aforenoted next-occurring rearrangement, following reaction of each thereof with the various prior compounds shown in FIG. 3. This next cycle of typical reactions is with a different one of the next separate reactants 6, 7, 8, 9, and 10 to form more new compounds thereof herein illustrated. Here, reagent identifications 29 through 33 are shown as R11, R12, R13, R14 and R15.

Figure 6:
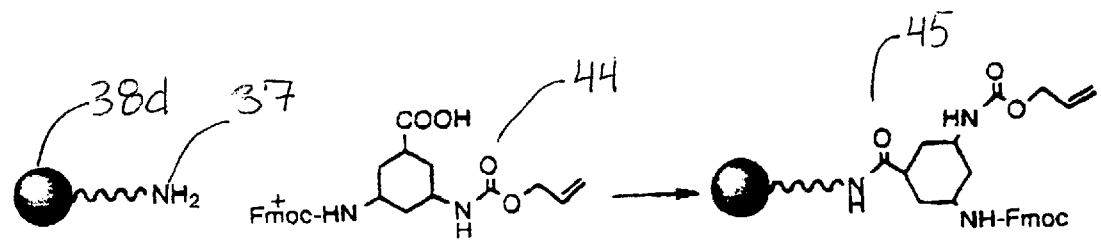
FIG. 6 illustrates a typical prior art reaction of the types practiced (conducted) utilizing the apparatus(es) and method (s) of this invention, here illustrating a template compound built onto an amino group functionalized polymer to result in a bead-mounted initial reactant utilized in several different parallel arrays aforenoted and described further below.

FIG. 6 illustrates a typical prior art ration of the types practiced (conducted) utilizing the apparatus(es) and method (s) of this invention, here illustrating an initial template (bead-mounted) compound being built onto an amino group 37 of a bead-mounted functionalized polymer 38d. the amino group 37 is conventionally reacted with a beginning bead-mountable reactant—typically 3-allyloxycarbonylamino-5-flluorenyl oxycararbonylamino-cyclohexyl carboxylic acid 44 within a coupling reactant—dicyclohexyl-carbodiimide (DDC) coupling reagent, forming the bead-mounted reactant thereof 45.

Figure 7:
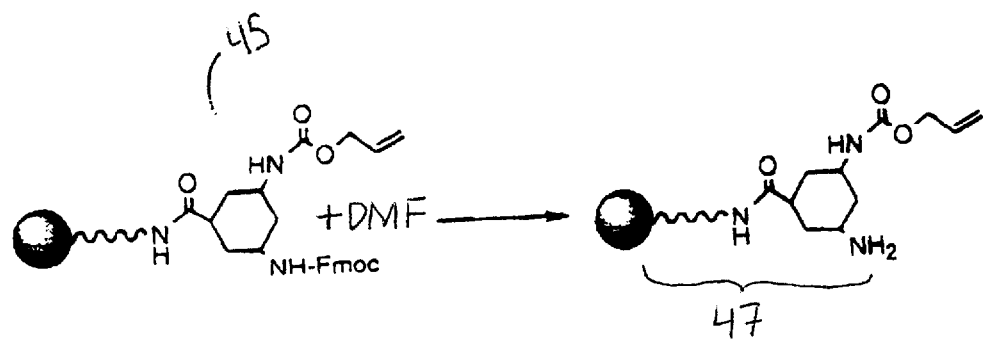
FIG. 7 illustrates a further typical prior art reaction for sometimes typically converting a bead-mounted amino group-protected compound to a still bead-mounted product in its amino-group substituted form.

FIG. 7 illustrates a further typical prior art reaction for sometimes typically converting the bead-mounted compound 46 (heretofore present to protect the otherwise free-amino function of the bead-mounted 3-allyloxycarbonylamino-5-flluorenyl oxycararbonylamino-cyclohexyl carboxylic acid of indicia 44) from its polymer-carrying bead-mounted state, from a substituted unprotected amino-group to NH2 substituted form as product 45 (3-allyloxycarbonylamine-5-fluorenyloxycarbonylamino-cyclohexxycarboxaminine), by its reaction with piperidine (DMF) to remove the amino-substituent (typically fluorenylmethyl-oxycarbonyl) by replacing the same with an "—H)" as a free amino function bead-mounted product 47.

Figure 8:
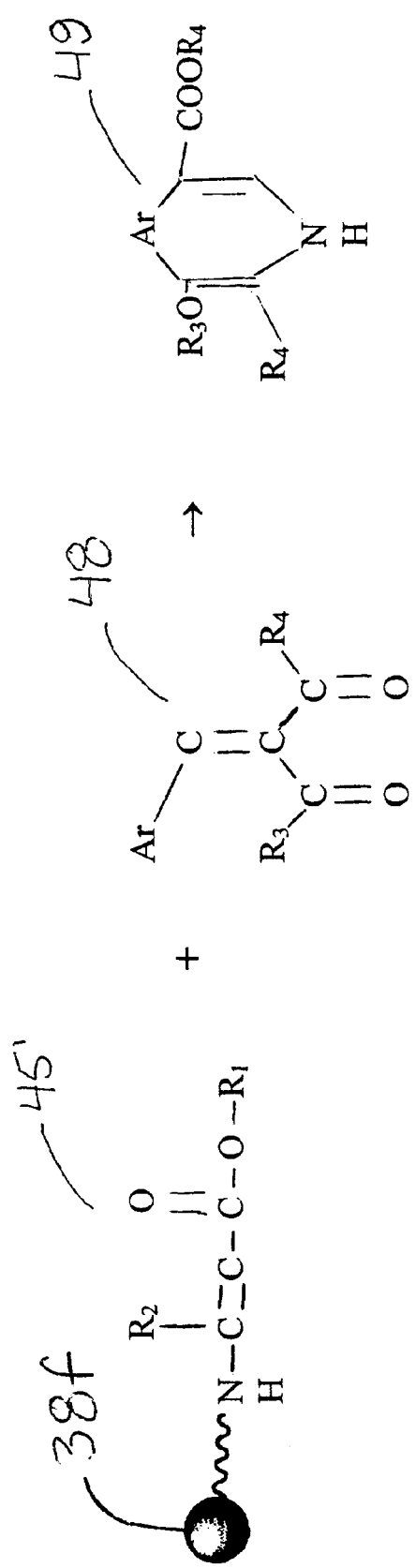
FIG. 8 symbolically and diagrammatically represents when typically utilizing the apparatus of FIGS. 11 through 14 of this invention, (generically) a bead-mounted reactant compound reacted with (treated with) an aryl-ketoester to result in a bead-free substituted pyridine-type well-known prior art nifedipine compound.

FIG. 8 symbolically and diagrammatically represents when typically utilizing the apparatus of FIGS. 11 through 14 of this invention, (generically) the bead-mounted enamine 45' intermediate compound (of FIG. 9B) of bead 38f reacted with (treated with) an aryl-ketoester 48 to result in a bead-free prior art substituted pyridine-type nifedipine compound 49. That compound here is illustrated as nifedipine which is a known calcium channel blocker utilized in treating hypertension.

FIG. 9A in a table-like arrangement symbolically and diagrammatically represents (discloses) typical other conventional prior art initial polymer resin reactants utilizable in the present invention apparatus and method array reactions, as these building blocks each to be coupled to an amino group on the cyclohexyl template compound typically illustrated in each of FIG. 6 and FIG. 7 (indicia 45) and appear prior to being bead-mounted in typically the prior art illustrated in foregoing FIG. 6 (indicia 44). A typical resultant bead-mounted compound such as shown at indicias 45 of FIG. 6 and 47 of FIG. 7, for which any one of the FIG. 9A compound may be likewise utilized (rather than the bead-mounted compound 45 or 47). The disclosed several merely representative FIG. 9A bead-polymer mountable chemical compounds are separately itemized (identified) as compounds 9A1, 9A2, 9A3, 9A4 and 9A5, respectively. These particular compounds are identified by name in the following list of INITIAL POLYMER REACTANTS:

3-allyloxycarbonylamino-5-fluorenyloxycarbonylamino-cyclohexyl-1-carboxylic Acid The polymer is an amino group functionalized polystyrene called Rink resins

| I | cyclopentylcarboxylic acid | (Fig. 9B/1) |
| II | beazoic acid | (Fig. 9B/2) |
| III | 2-carboxyl-pyrrol | (Fig. 9B/3) |
| IV | 3-carboxyl-pyridine | (Fig. 9B/4) |
| V | para-methoxy-benzoic acid | (Fig. 9B/5) |
| 1 | benzaldehyde | (Fig. 9A reactant) |
| 2 | para-methyl-benzaldehyde | (Fig. 9A reactant) |
| 3 | 2-furfural | (Fig. 9A reactant) |
| 4 | 2-carboxaldehyde-pyridine | (Fig. 9A reactant) |
| 5. | n-butylaldehyde | (Fig. 9A reactant) |

The following is a list of the ARRAY PRODUCTS:

| I. | 3-benzylamino-5-cyclopentylcarbonylamino-cyclohexyl-carboxamide (FIG. 9C) |
| II. | 3-benzylamino-5-benzylcarbonylamino-cyclohexyl-carboxamide (FIG. 9C) |
| III. | 3-benzylamino-5-pyrrolyl-2-carbonylamino-cyclohexyl-carboxamide (FIG. 9C) |
| IV. | 3-benzylamino-5-pyridyl-3-carbonylamino-cyclohexyl-carboxamide (FIG. 9C) |
| V. | 3-benzylamino-5-para-methoxy-phenylcarbonylamino-cyclohexyl-carboxamide (FIG. 9C) |
| I2. | 3-para-methyl-benzyl-5-cyclopentylcarbonylamino-cyclohexyl-carboxamide. |
| II2. | 3-para-methyl-benzyl-5-benzylcarbonylamino-cyclohexyl-carboxamide |
| III2. | 3-para-methyl-benzyl-5-pyrrolyl-2-carbonylamino-cyclohexyl-carboxamide |

-continued

| | |
|---|---|
| IV2. | 3-para-methyl-benzyl-5-pyridyl-3-carbonylamino-cyclohexyl-carboxamide |
| V2. | 3-para-methyl-benzyl-5-para=methoxy=phenylcarbonylamino-cyclohexyl-carboxamide |
| I3. | 3-furanyl-2-methyl-amino-5-cyclopentylcarbonylamino-cyclohexyl-carboxamide |
| II3. | 3-furanyl-2-methyl-amino-5-benzylcarbonylamino-cyclohexyl-carbonxamide |
| III3. | 3-furanyl-2-methyl-amino-5-pyrrolyl-2-carbonylamino-cyclohexyl-carboxamide |
| IV3. | 3-furanyl-2-methyl-amino-5-pyridyl-3-carbonylamino-cyclochexyl-carboxamide |
| V3. | 3-furanyl-2-methyl-amino-5-para-methoxy-phenylcarbonylamino-cyclohexyl-carboxamide |
| I4. | 3-pyridyl-2-methyl-amino-5-cyclopentylcarbonylamino-cyclohexyl-carboxanmide. |
| II4. | 3-pyridyl-2-methyl-amino-5-benzylcarbonylamino-cyclohexyl-carboxamide |
| III4. | 3-pyridyl-2-methyl-amino-5-pyrrolyl-2-carbonylamino-cyclohexyl-carboxamide |
| IV4. | 3-pyridyl-2-methyl-amino-5-pyridyl-3-carbonylamino-cyclohexyl-carboxamide |
| V4. | 3-pyridyl-2-methyl-amino-5-para-methoxy-phenylcarbonylamino-cyclohexyl-carboxamide |
| I5. | 3-butylamino-5-cyclopentylcarbonylamino-cyclohexyl-Carboxamide |
| II5. | 3-butylamino-5-benzylcarbonylamino-cyclohexyl-carbonxamide |
| III5. | 3-butylamino-5-pyrrolyl-2-carbonylamino-cyclohexyl-carboxamide |
| IV5. | 3-butylamino-5-carbonylamino-cyclohexyl-carboxamide |
| V5. | 3-butylamino-5-para-methoxy-phenylcarbonylamino-cyclohexyl-carboxamide |

The compound 9A1 is a cyclopentylcarboxylic acid. The compound 9A2 is a benzoic compound. The compound 9A3 is a 2-carboxyl-pyrrol. The compound 9A4 is 3-carboxyl-pyridine. The compound 9A5 is a para-methoxy-benzoic acid. The bead-mounted form of typically any one of these compounds may be utilized as an alternative (in a bead-mounted state) for the typically illustrated bead-mounted initial polymer resin reactant 47 of FIG. 7 and FIG. 9C (FIG. 9C being described hereinafter).

Figure 9C:
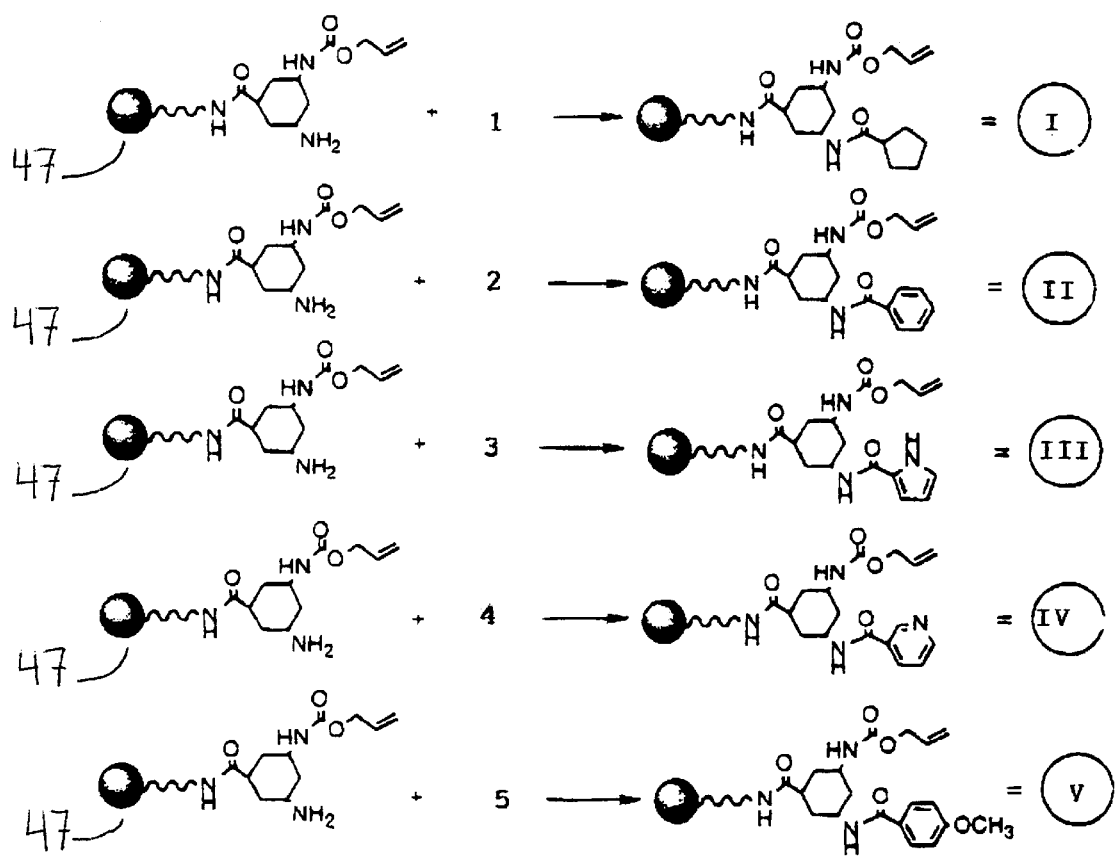
FIG. 9C symbolically and diagrammatically represents a five member array of segregated one of a common different bead-mounted reactant compound 47, separately in parallel reactions being reacted with different ones of the FIG. 9B reactants 1 through 5 thereof, to produce the five different separate bead-mounted "array products", namely (as taken from the prior disclosed typical Array Products (I), and (II), (III), (IV) and (V))

FIG. 9B symbolically and diagrammatically in another table-like arrangement represents (discloses) typical conventional prior art other array-utilizable reactants to be subsequently reacted as a part of the differing sequential arrays provided by the apparatuses and method(s) of this invention. This FIG. 9B discloses five separate merely typical prior art compounds here represented to be reacted in the merely typical novel array-arrangement method illustrated in FIG. 9C to be utilizing an alternative other bead-mounted polymer resin reactant—namely the FIG. 7 bead-mounted compound 47.

FIG. 9C symbolically and diagrammatically represents a five member array of segregated one of the same bead-mounted reactant compound 47, reacted with different ones of the FIG. 9B reactants 1 through 5 thereof, to produce the five different separate bead-mounted "array products"—namely I, II, III, IV and V, namely (as taken from the prior disclosed typical Array Products), namely (I): prior identified I1-3 benzylamino-5-cyclopentyl carbonylamino-cyclohexyl-caarboxamide, and (II): prior identified I2—3-benzylamino-5-benzylcarbonylamino-cyclohexyl-carboxamide, and (III)3-benzylamino-5-pyrrolyl-2-carbonylamino-cyclolyexyl-carboxamide, and (IV) 3-benzylamino-5-pyrrolyl-3-carbonylamino-cyclohexyl-carboxamide, and (V) 3-para-methyl-benzyl-5-para-methoxy-phenylcarbonylamino-cyclohexyl-carboxamide.

Figure 10:
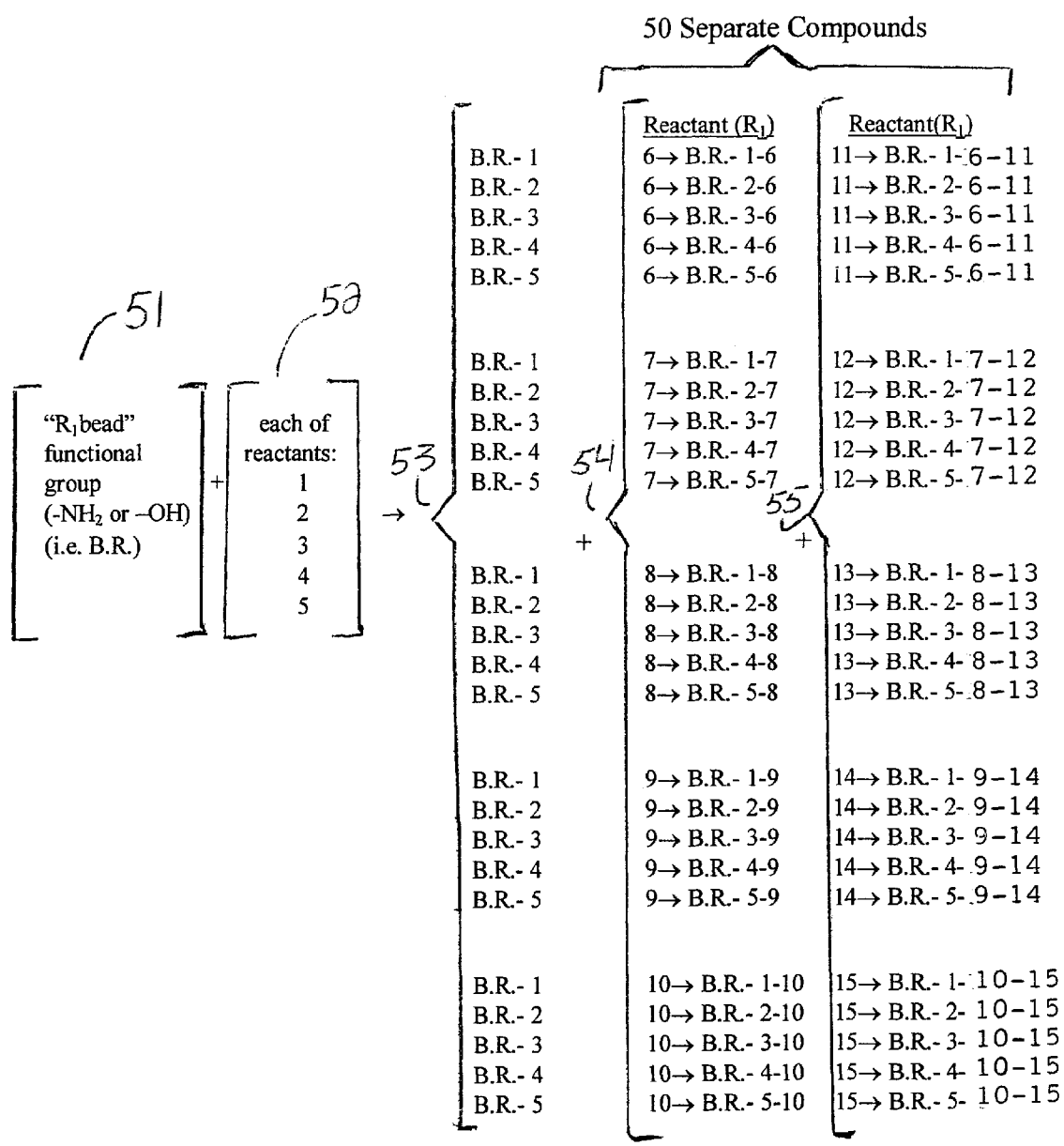
FIG. 10 symbolically and diagrammatically represents typically the same reactor unitary support structure aforenoted of FIG. 1 as typically utilizing the apparatus of this invention, the reactions illustrated in FIGS. 1, 3, 4 and 5, diagrammatically illustrating the initial reactants to and subsequent intermediate reactants and initial and final products—the final products showing for each all of the combined initial and subsequent compounds—(including the final illustrated 60 different compounds)

FIG. 10 symbolically and diagrammatically represents when typically utilizing the apparatus of FIGS. 11 through 14 of this invention, the reactions illustrated in FIGS. 1, 3 and 4, diagrammatically illustrating forming the initial bead-mounted reactants 51 and to secure bead-mounted reactants 52 and subsequent thereafter forming five "separate" groups (of teabags-beads) of each of bead reactants—a separate product of each of A, B, C, D and E—as intermediate (25 separate) reaction products/new compounds 53 and initial subsequent products/separate groups 54 and likewise 55—being the respective products formed by the reactions illustrated in each of FIGS. 1, 3, 4, and 5 respectively—the final products showing for each all of the combined initial and subsequent compounds—54 and 55 (all-together including an illustrated total of 75 different compounds). Reactions of FIG. 5 would add another 25, totaling 100 subsequent reactions (treatments) with one further additional reactants 13 through 17 (concurrently reacted with all of the five groups) would result in an additional 25 more compounds, totaling 125 compounds, and further thereafter subsequent treatments would each time add an additional 25 more compounds. Moreover, it must be understood that the initial set-up for a reaction involving merely "A" through "E" could be expanded (for example) to typically A through J (a total of ten and concurrently supports 3a through 3e could be expanded to compartments 3a to 33j (from five compartments to ten compartments), and the aforenoted produced separate bead-mounted compounds would be increased by 25 from the illustrated 75 to a greater number 100 total new compounds, for example. By further increasing the number of supports such as 3a through 3e and/or increasing the number of reactants such as B.R.-A through B.R.-B, etc. and reactants further beyond the illustrated 1 through 9C, total potential total new compounds producible are in face infinite in number. As previously illustrated in FIGS. 6 through 9, the functional groups —OH and —NH2 are mounted on teabag beads 50, for subsequent reaction with one of reactants 9–12 and 13–33 (such as typically the bead-mounted reactants A through E), and thereafter sequentially as illustrated with (typically) reactants 1 through 10 typically illustrated in reaction groups thereof of FIG. 10.

Figure 10A:
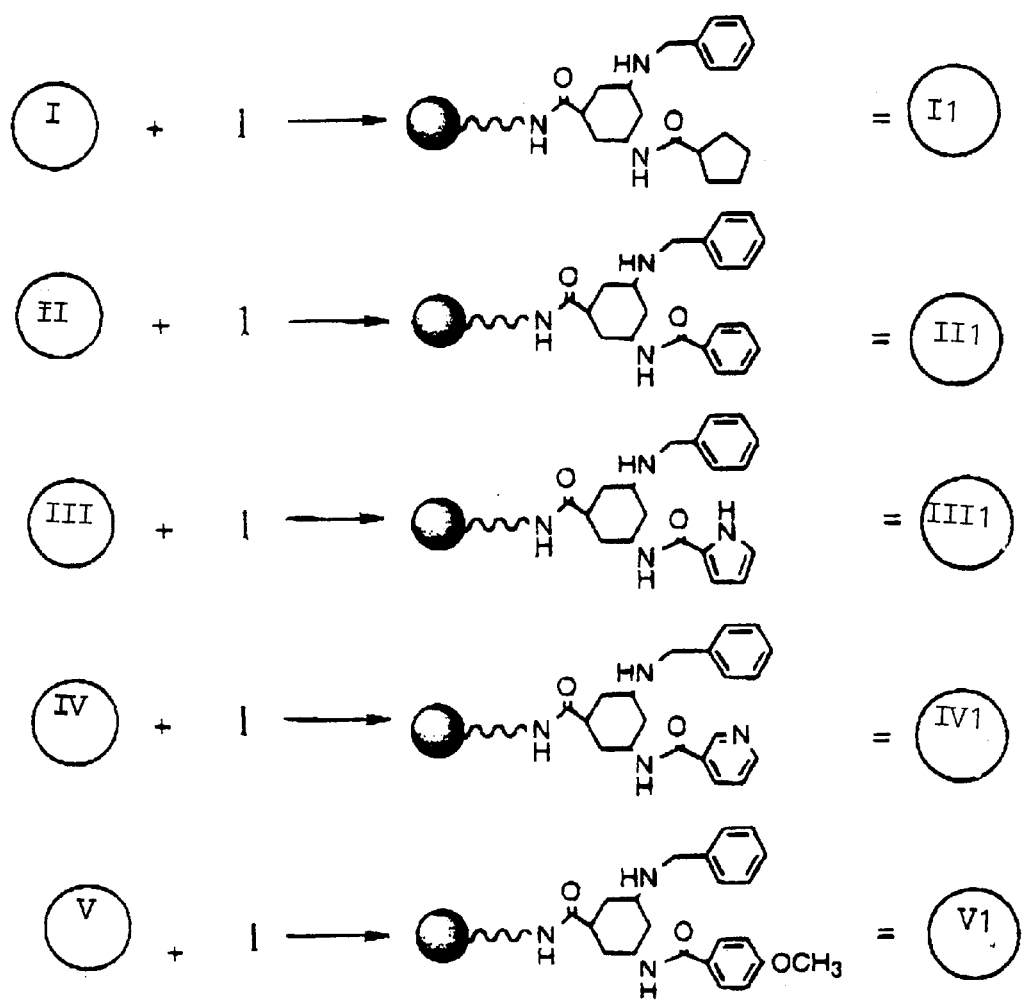
FIG. 10A symbolically and diagrammatically represents a chart illustrating a first-array concurrent but segregated reactions of the FIG. 9C First Array Products I through V, with common second reactant "1" identified all (each thereof) as a common array reactant "1", to produce separate and segregated array products I1 through V1.

FIG. 10A symbolically and diagrammatically represents a chart illustrating a first-array concurrent but segregated reactions of the FIG. 9C First Array Products I through V, with common second reactant "1" identified all (each thereof) as a common array reactant "1", to produce separate and segregated array products I1 through V1.

Figure 10B:
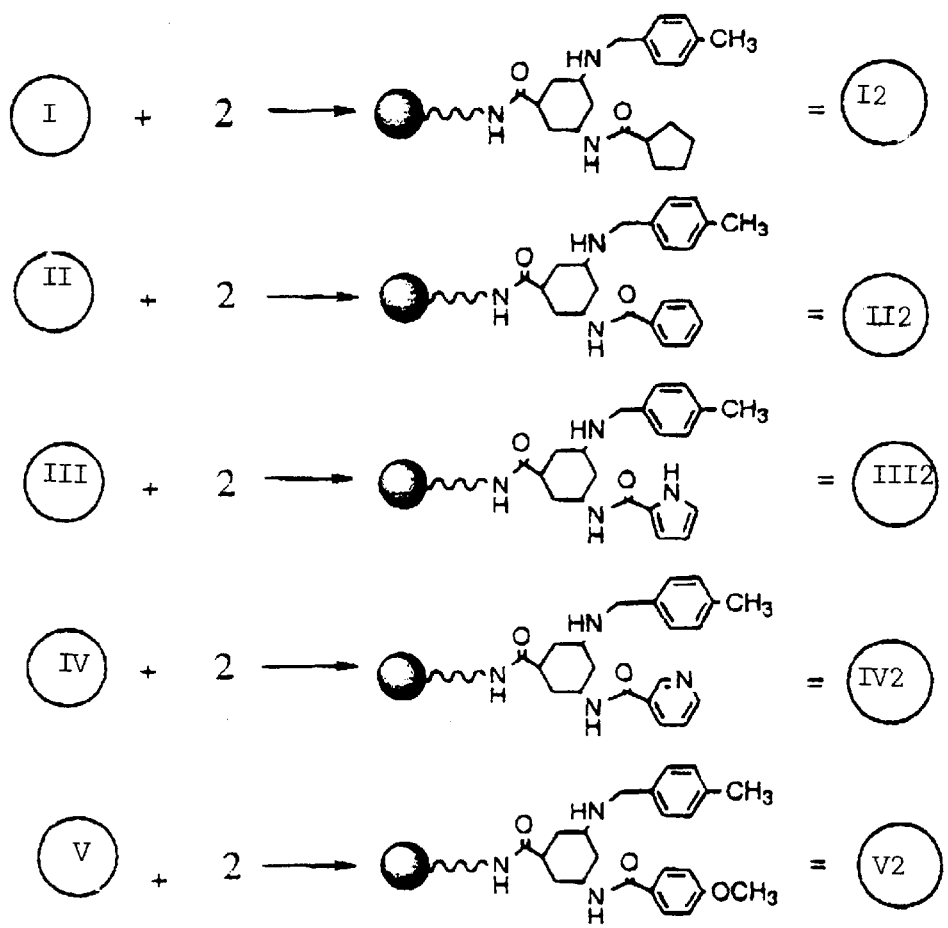
FIG. 10B symbolically and diagrammatically represents a second chart illustrating a second-array concurrent but segregated reactions of the FIG. 9C First Array Products I through V, with common different (second) reactant "2" identified all (each thereof) as a common array reactant "2", to produce separate and segregated array products I2 through V2.

FIG. 10B symbolically and diagrammatically represents a second chart illustrating a second-array concurrent but segregated reactions of the FIG. 9C First Array Products I through V, with common different (second) reactant "2" identified all (each thereof) as a common array reactant "2", to produce separate and segregated array, products I2 through V2.

Figure 10C:
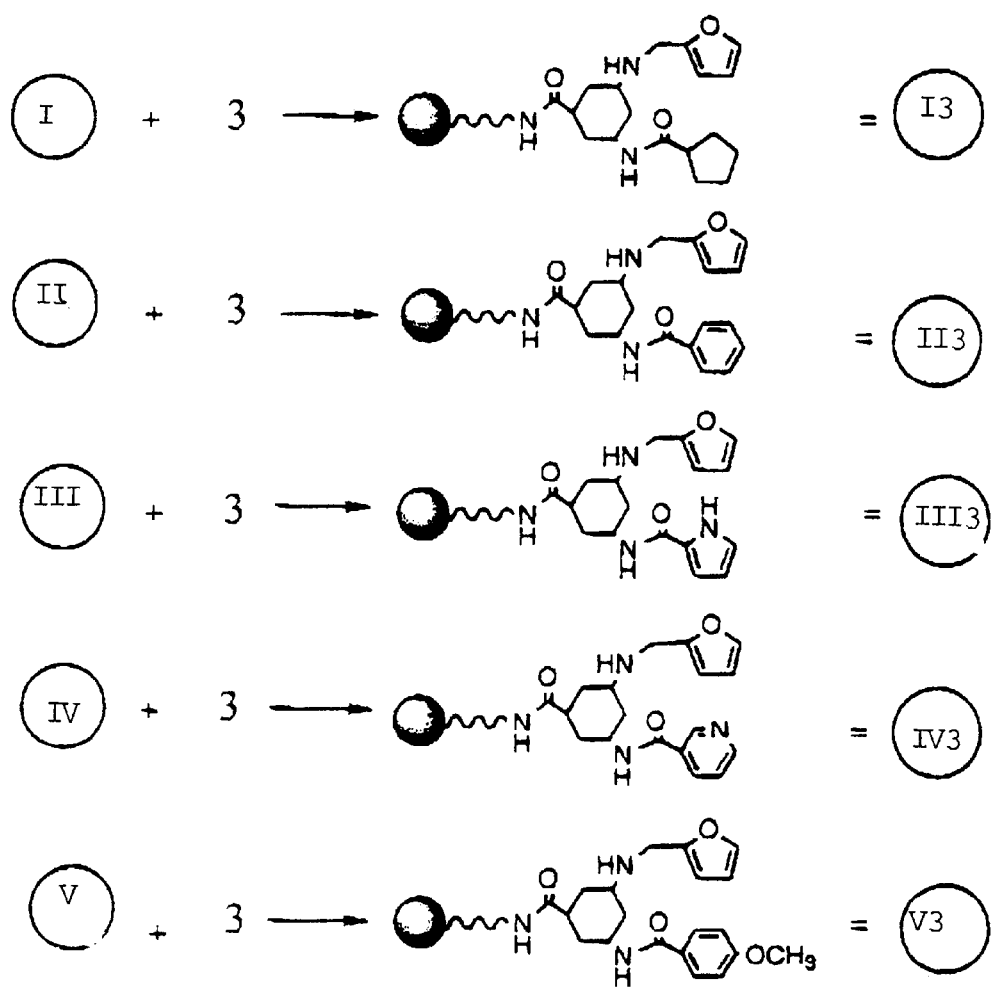
FIG. 10C symbolically and diagrammatically represents a third chart illustrating a third-array concurrent but segregated reactions of the FIG. 9C First Array Products I through V, with common different (third) reactant "3" identified all (each thereof) as of a common array reactant "3", to produce separate and segregated array products I3 through V3.

FIG. 10C symbolically and diagrammatically represents a third chart illustrating a third-array concurrent but segregated reactions of the FIG. 9C First Array Products I through V, with common different (third) reactant "3" identified all (each thereof) as a common array reactant "3", to produce separate and segregated array products I3 through V3.

Figure 10D:
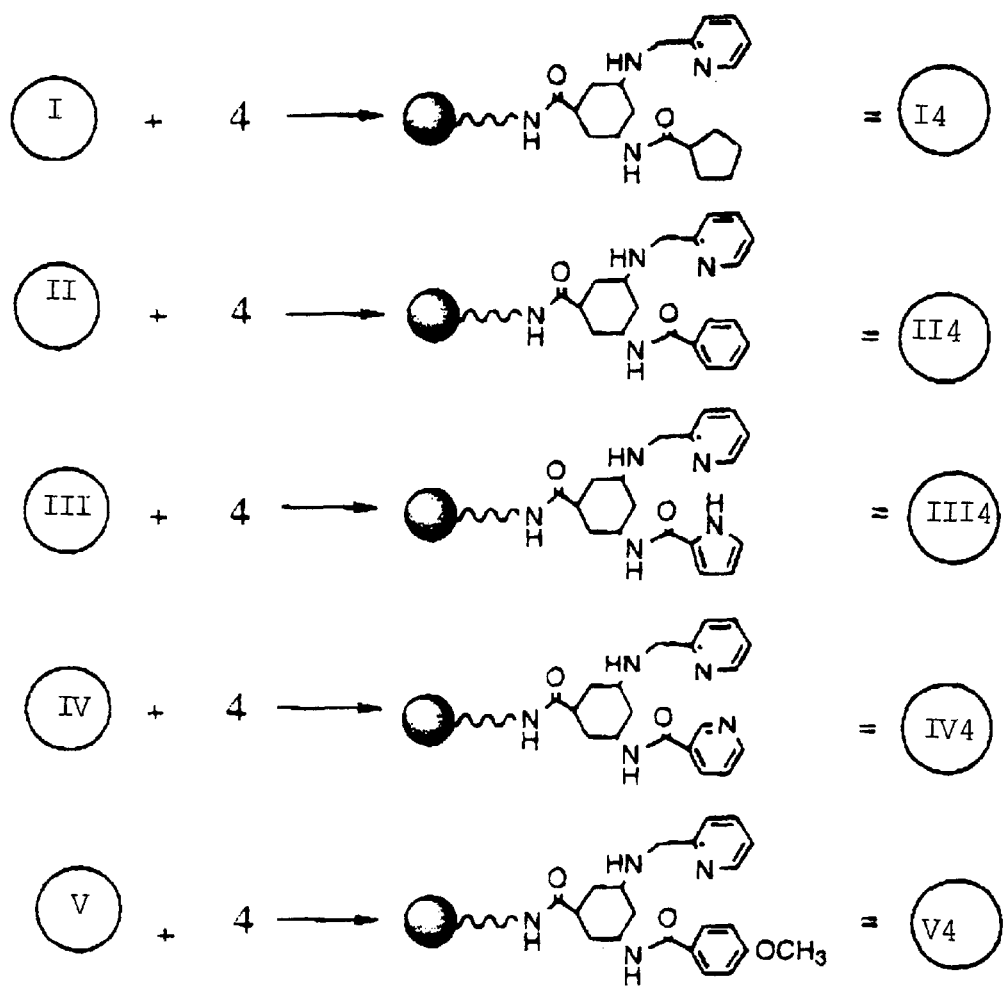
FIG. 10D symbolically and diagrammatically represents a fourth chart illustrating a fourth-array concurrent but segregated reactions of the FIG. 9C First Array Products I through V, with common different (fourth) reactant "4" identified all (each thereof) as a common array reactant "4", to produce separate and segregated array products I4 through V4.

FIG. 10D symbolically and diagrammatically represents a fourth chart illustrating a fourth-array concurrent but segregated reactions of the FIG. 9C First Array Products I through V, with common different (fourth) reactant "4" identified all (each thereof) as a common array reactant "4", to produce separate and segregated array products I4 through V4.

Figure 10E:
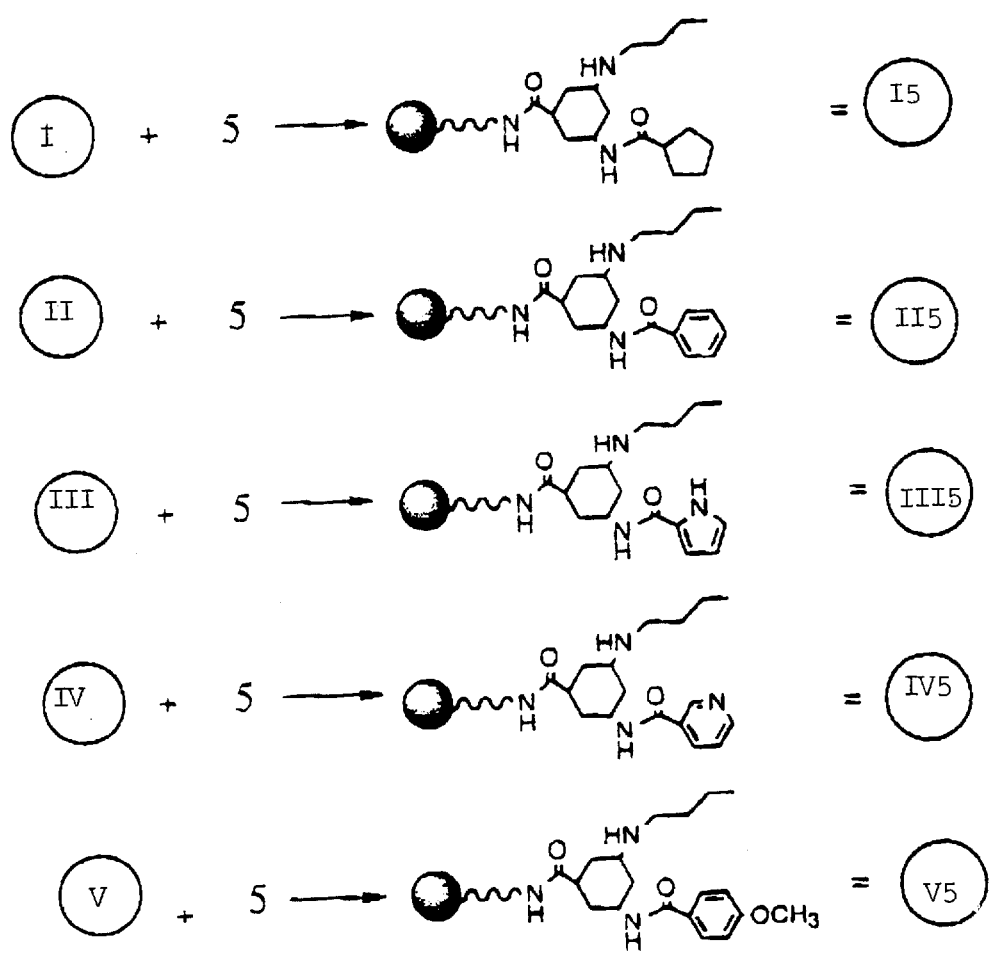
FIG. 10E symbolically and diagrammatically represents a fifth chart illustrating a fifth-array concurrent but segregated reactions of the FIG. 9C First Array Products I through V, with common different (fifth) reactant "5" identified all (each thereof) as a common array reactant "5", to produce separate and segregated array products I5 through V5.

FIG. 10E symbolically and diagrammatically represents a fifth chart illustrating a fifth-array concurrent but segregated reactions of the FIG. 9C First Array Products I through V, with common different (fourth-reactant "5" identified all (each thereof) as a common array reactant "5", to produce separate and segregated array products I5 through V5.

FIG. 11 symbolically and diagrammatically represents a side cross-sectional view of a reagent liquid-containable vessel-like apparatus of this invention utilizing dynamic fluid flow means to change combinations of fixed-reactant/liquid reaction mixture combinations to effect different parallel reactions and a series of parallel reactions different from preceding reactions. It illustrates the mounting of several separate teabags within a common liquid reactant mixture (reagent-flow) and treatment space thereof. Also illustrated in block-form are separate but integrated temperature and liquid reactant mixture addition and removal mechanisms as a part of the total apparatus combination. The vessel has a plurality of separate bottom-portion inlet and outlet conduits to inner-space of bottom portion(s) of the reagent-containing vessel. (While FIG. 11 illustrates channeling into and out of the bottoms of the reaction vessels, filling could be accomplished alternatively or additionally by side ports or even by gravity from unconnected sources located above the reaction vessels.) The conduits include a separate on-off flow control valve, suited for being connected to recirculation mechanism and temperature cooling and/or heating mechanism(s) and/or for drainage of spent reagent from the inner space of the apparatus vessel illustrated. Also illustrated is a vibrator mechanism vibrateable when switched-on, of the reaction liquid in which the teabags are immersed. In addition to vibration, agitation may be included and may be mechanical, ultrasonic, magnetic, gas bubbling, or other known methods. The vibration is of a structure and vibrates in multiple directions along multiple x and y, etc. axes and planes, as to impart multi-directional movement of reaction liquids of reactants in contact with the various teabags and/or initial surface-mounted reactant-carrying beads, geometrically enhancing maximum and complete reaction of reactant(s) with bead-mounted initial reactant(s). Likewise there is/are inflow and outflow conduit (s) and pump mechanism(s) and valves controlling the same, adapted to effect alternate addition of and removal of liquid reactant (or suspension or solution thereof). Also, in flow communication with free-space above the apparatus liquid/reactant level above the level of supported beads, is an electrically driven reversible-flow gas pump connected to either or alternately free-space or a gas supply such as nitrogen (inert) gas to prevent contamination of the reactant suspension and/or solution. The electrically gas pump likewise has alternate-positioning on-off stop-cock valves and a reversible pump for alternately inserting in and withdrawing the free-space above the reactant-level, the air and/or gas such as nitrogen. FIG. 11 symbolically and diagrammatically represents and illustrates as representative of each and all of the separate reactor compartments of separate typical supports this typical and representative solely support $3e$ being described together with its associated functional spaces and members as follow. There are teabags $4u$, $4v$, $4w$, $4x$ and $4y$ each having its suspended "bag" (vessel) as teabag vessels $93s$, $93t$, $93u$, $93v$, and $93w$—each having hollow inner space extending from the typical tub-opening $94s$ downwardly and continuous with lower enclosure space communicating through apertures $96q$ through $96z$ of the various teabag tubes $93s$ through $93w$ supported within space of contained liquid-containable vessel for containing and retaining liquid reactant below liquid upper level position $95$. The lower closed tubes each thereof above-identified as teabag vessels $93s$ through $93w$ enclose and support physical-chemistry reactant-affixed chemical compounds having a reactive functional group affixed to the reactant-carrying beads, the reactant-bearing beads being typically the same for each teabag as indicated (shown) for teabag $93s$, namely beads $110$. Extending through the reactor side-wall $1'e$ is liquid-reactant either and/or alternately reactor-space addition and/or withdrawal tube $87e$, having an exterior liquid-flow pump $84e$ (with it electrical power source $109$, and other power source line $109e'$) with a position selecting lever-switch movable to and from and between alternate inflow and outflow positions $85e$ and $86e$ in either of opposite directions in or outflow liquid-channeling tube $92e$ and vessel-space continuing tube $87e$ with is liquid reactant inlet and/or outlet in alternate of opposite directions of flow—depending upon the positioning of the flow-direction control switch $87e$; also illustrated is electrical off-on (toggle) switch $89e$ and its alternately positioning flip-lever $90e$ thereof, such that alternately open and close liquid-flow valve $91e$ and $91e'$ control flows through conduits $92e$ and $92e'$ ranging from zero flow to an ascertained rate (by alternate manual adjustment of degree to which the valve is partially or completely alternately open or closed). Other illustrated elements include typical teabag cover caps $74$ through $78$ preventing contamination by closing upper openings such as the typical upper opening $94s$, and teabag mounting holes $79e$ through $83e$, alternate on-off flip (toggle) switch $89e'$, flip-lever $90e'$, vessel bottom $97$, vibrator mechanism $98$, toggle flip switch for alternate on or off; it is noted that this vibrator employs preferably a conventional available prior-art vibrator mechanism $98$ adapted to substantially concurrently and/or alternately in x (substantially horizontal) and y (substantially vertical) plains which result in a substantially three-dimensional movement of the vibrator symbolic arm $98'$ alternately switchable on and off by toggle lever $99$, with power source $109"$. Blanketing typically nitrogen gas-pump $105$ includes an alter-direction of pumping the inert gas alternately into and from space $3ee$ when variable flow valve $104$ is open to a flow-permitting degree through conduit $103$ flow-space $102$ to and from conduit opening $101$ within the reactor space $3ee$ and switch $100$ is manually selectable of the desired direction of inert gas (nitrogen) flow/pumping, powered by electrical power source $105$. Typically reactor vessel side $1"e$ mounts a typical (symbolic) reactant typically funnel-type liquid reactant inlet structure $106$ having liquid inlet opening $111$ for convenient adding in direction $107$ of selected liquid reactant in direction $108$ through inside-space $3ee$ inlet-opening $108$. Also there is a heating or cooling or alternately interchangeable heating and cooling unit $121$ symbolically illustrated, being state of the art mechanism(s), for selective heating or cooling the liquid reactant during or before its introduction into the reactor teabag(s) mounting space.

Figure 12:
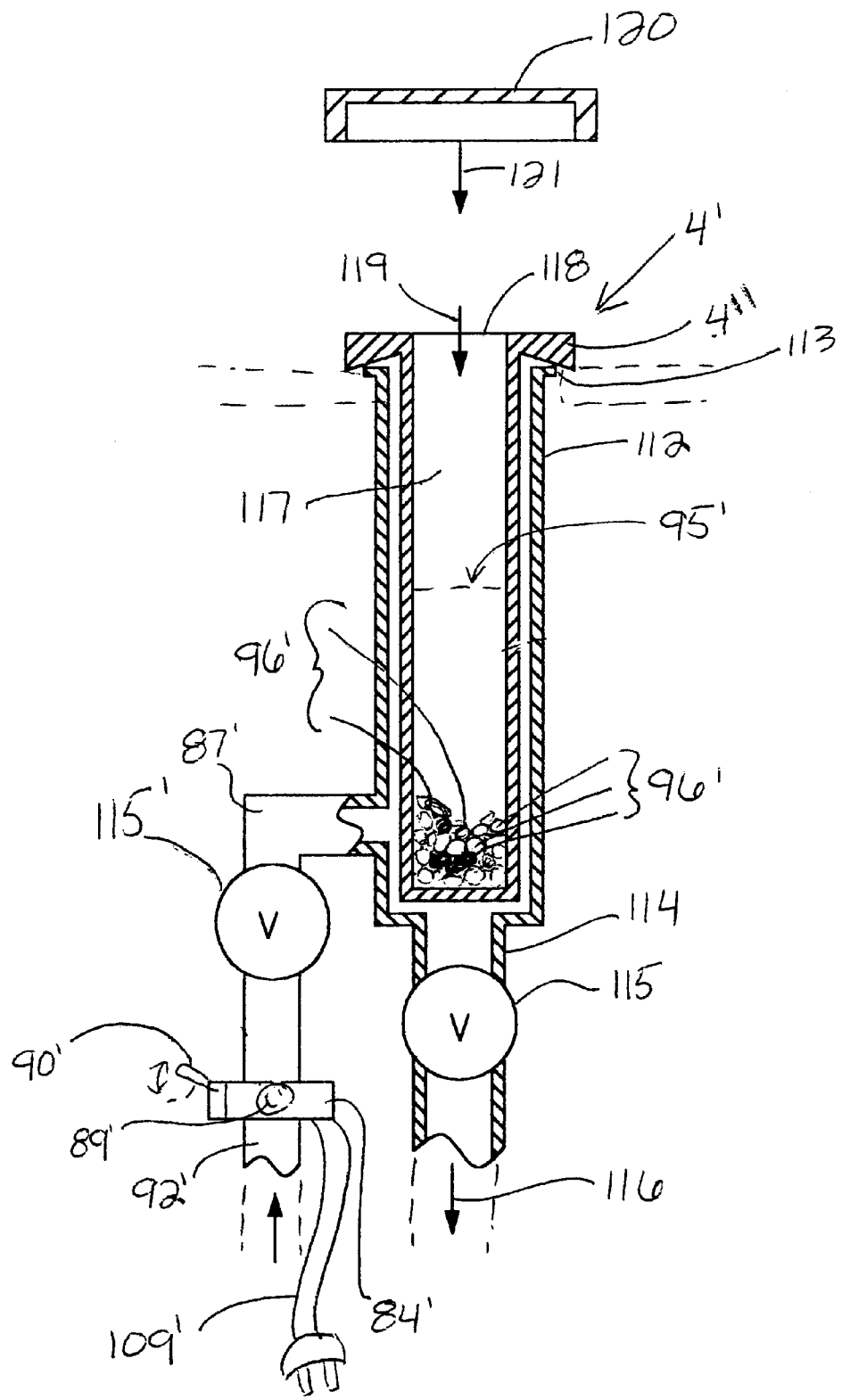
FIG. 12 symbolically and diagrammatically represents a typical other combination of a single teabag-mounting structure for single treatment thereof, with off-on check-valves for flow therethrough of liquid reagent, including an associated optionally multiple addition and drain conduit with valve, together with an alternate mechanized liquid-reactant addition mechanism and structure similar to that of FIG. 11.

FIG. 12 symbolically and diagrammatically represents a typical other combination of a single teabag-mounting structure both suitably including provision for single treatment and for a check-valve alternate intermittent opening and closing-off flow therethrough of liquid reagent before and after treatment of bead(s) mounted in the mounted teabag, and also including the mounted teabag structure thereof. FIG. 12 diagrammatically and symbolically illustrates an alternate single-teabag reactor $4'$ and reactor vessel support 112 with an upper mounting flange 113 with a bottom (or lower) reactor vessel liquid reactant out-flow conduit 114 having a typically conventional manually controllable alternately open-closed check-valve mechanism 115 for drainage or typically gravity-flow in direction 116. The teabag thereof substantially corresponds to previously-described teabags, here identified as teabag structure 4' having typical flange 4" with a typical reactant contemplated level of about 95'. The teabag typically has the flange 4", innerspace 117, and opening 118 for introduction 119 of liquid reactant and teabag beads 96', having the liquid-outlet apertures (holes) 96'. Similar to FIG. 11, there is provided preferably a lid 120 for protectively intermittently capping by movement in direction 121 over the teabag flange 4". There is also show a preferred alternate reactant-introduction tubular mechanism corresponding to that shown in FIG. 11, namely this embodiment's tubular feed lines 92' and 87' having a corresponding valve 115', the variable alternately different-direction (of flow-pump 84' with the choice of direction (of flow) switch 90' and the rate-of-flow control lever 89' and the power source 109' and the conduit source and/or exit conduit, and the on-off toggle flip lever for turning on and off the electrical power.

Figure 13:
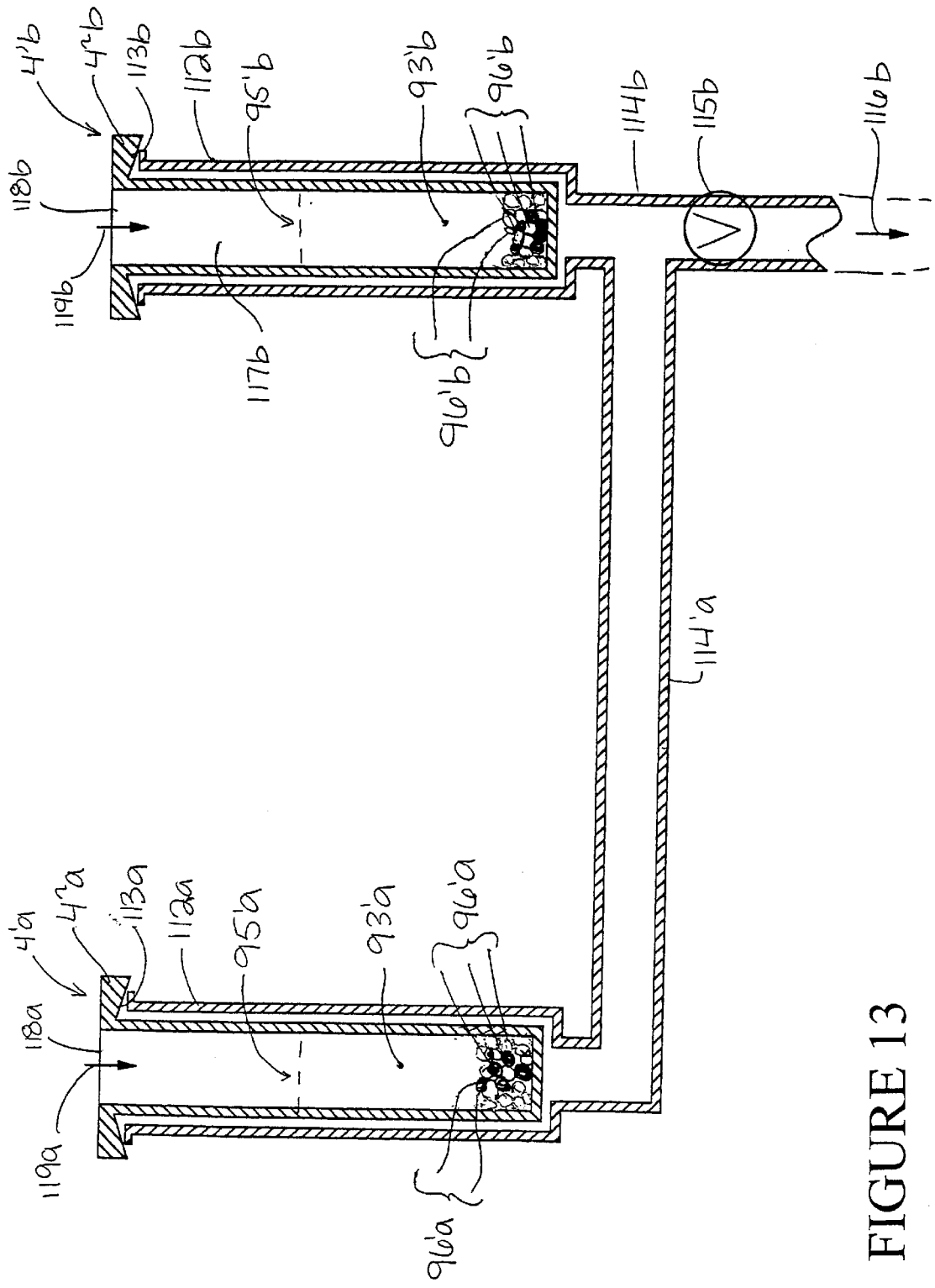
FIG. 13 symbolically and diagrammatically represents an alternate embodiment having optionally one or more units (illustrating two units in combination) enabling intermittent capping-off of an addition-opening of a mounting teabag within a mounted reagent containing vessel having separate bottom inlet and outlet conduits for of the reagent-containing vessel; and, FIG. 14 shows a partly schematic diagram of a present invention dynamic matrix system apparatus which uses both dynamic fluid flow means and mechanical movement means for fixed-reactant/liquid reactant mixture shifting.

FIG. 13 symbolically and diagrammatically represents an alternate embodiment to that of FIG. 11, for the intermittent capping-off of the addition-opening of a mounting teabag within a mounted reagent-containing vessel. The FIG. 13 illustrates a multiple-unit (two-teabag-support) reactor as a variation on that of FIG. 1 and FIG. 12, having substantially corresponding elements as that of FIG. 12 for purposes of identification.

Figure 14:
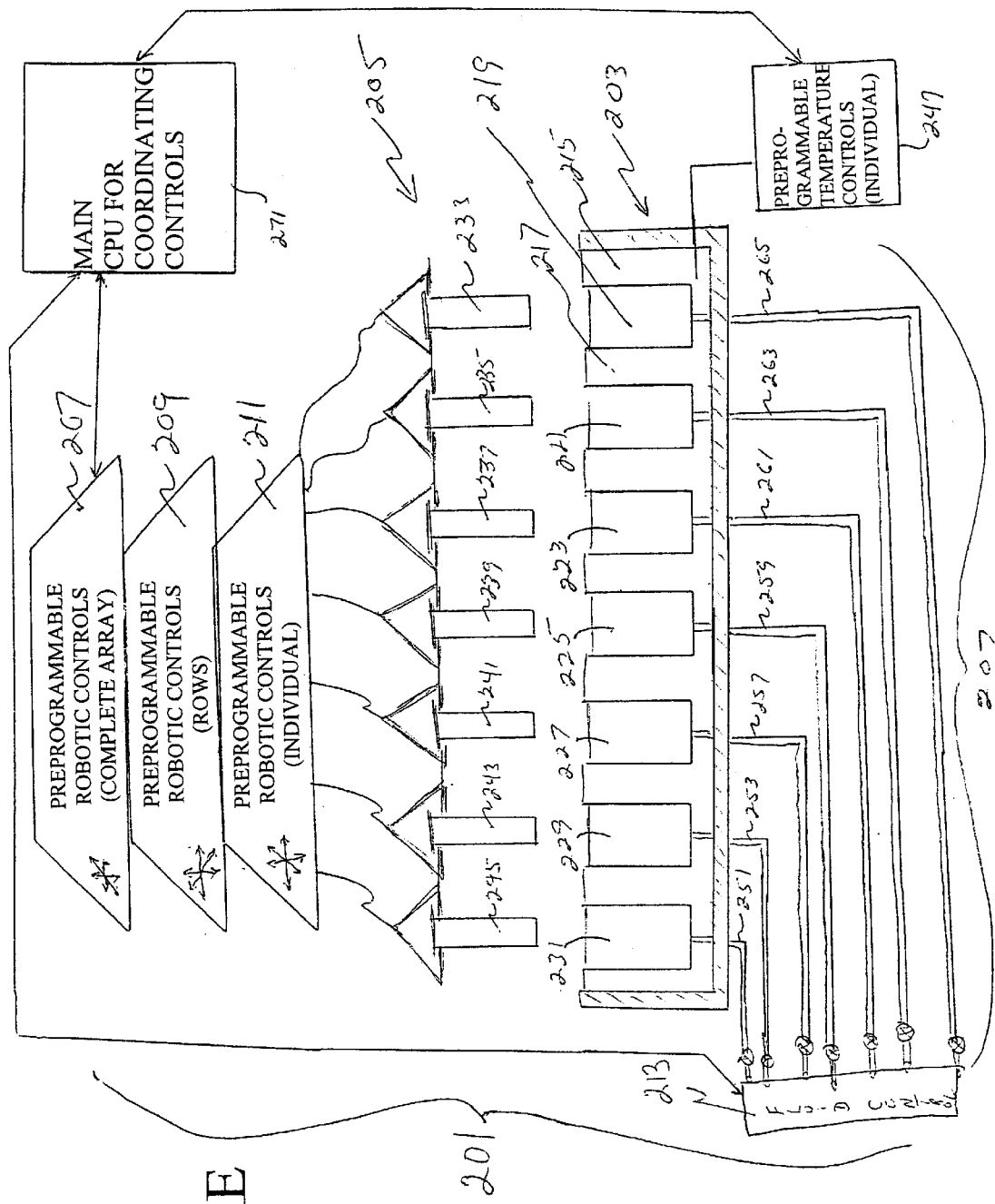

FIG. 14 shows a preferred embodiment present invention apparatus 201 which includes a base support structure 203, a physical chemistry teabag support structure 205 and preprogrammable robotic controls 207, 209 and 211 as well as fluid control 213. In this embodiment base support structure 203 has divider walls such as walls 215 and 217 with an array of reaction vessels. In this case, reaction vessels 221, 223, 225, 227, 229 and 231 are in a single row. Additional rows would be located in front of and behind this row. Likewise, physical chemistry teabag support structure 205 has a row of individual teabags shown as teabags 233, 235, 237, 239, 241, 243 and 245. Other rows of teabags would be in front of and behind that row. The teabags are physical chemistry teabags which contain at least one fixed reactant and the reaction vessels such as reaction vessel 219 contain liquid reaction mixtures. The particular fixed reactants and liquid reaction mixtures are different from one another and the shifting of combinations of these have been fully elaborated upon above.

Apparatus 201 is shown to have both a mechanical movement means and a dynamic fluid flow means for its fixed-reactant/liquid reactant mixture shifting means, but apparatus 201 may be designed with either of these or both combined, as shown. Thus, affording choices for the user. (While FIG. 14 illustrates channeling into and out of the bottoms of the reaction vessels, filling could be accomplished alternatively or additionally by side ports or even by gravity from unconnected sources located above the reaction vessels.)

Preprogrammable temperature controls 247 afford the user the opportunity to arrange for adapting concise reaction temperatures as needed. Fluid controls 213 allow individual preprogrammed control of inlet outlet lines 251, 253, 257, 259, 261, 263 and 265, as well as to other lines not shown to control the addition and removal of liquid reactant mixtures to the various reaction vessels such as reaction vessel 219. Physical chemistry teabag support structure 205 has preprogrammable robotic controls which may move the complete array 207 of physical chemistry teabags such as physical chemistry teabag 233, rows 209 thereof, or individual units 211. Thus physical chemistry teabag support structure 205 may be lifted and lowered, shifted and/or rotated, individual rows may be lifted, lowered, shifted or otherwise manipulated as may the individual units. The exact mechanics of the robotics is within the skill of the artisan. In this particular embodiment there is a main cpu 271 for corresponding controls for all essential aspects of the apparatus 201 including robotics, fluid flow temperature control.

Although the above invention has been described with respect to specific types of chemical examples, it should be noted that the invention is applicable to a wide variety of possibilities. For example, the fixed reactants and/or the liquid reactant mixtures may be inorganic chemicals, organic chemicals or combinations, they may be bioreactive chemicals such as protein compounds, protein derivatives and even genetically engineered compounds. In other words, any chemical reaction or synthesis which now or in the future lends itself to teabag type processing may be employed with the apparatus and method of the present invention.

It should be obviously apparent that while solely bead-bonded compounds exhibiting functional group(s) of wholly "—OH" (i.e. hydroxyl) and "—NH2" (amino), it is within the obvious scope of the invention to employ any one or more of inexhaustible other functional groups alone or in combination. Likewise it should be obviously apparent that there are inexhaustible alternate reactants that could be utilized for the additive-reactions (repeat, to add-on other chemical substituents as merely typically illustrated herein) that may be utilized, with the broader scope of the invention. Likewise, other available or subsequently developed bead-mountable compositions or compounds or solid-physical chemistry approaches may be utilizing other than the mere illustrative bead-bonding resin aforenoted.

What is claimed is:

1. A method for synthesizing a plurality of chemical compounds simultaneously and to synthesize a series of plurality of simultaneously synthesized chemical compounds sequentially utilizing a dynamic matrix system, which comprises:

A. providing apparatus which includes:
   a. a base support structure having a plurality of reaction vessels arranged in at least a two dimensional predetermined array, each of said reaction vessels having sufficient wall and bottom structure to support and contain a liquid reactant mixture, each of said reaction vessels adapted to receive physical chemistry teabags therein for chemical synthesis;
   b. a physical chemistry teabag support structure adapted to hold and support a plurality of physical chemistry teabags arranged in at least a two dimensional predetermined teabag array, corresponding to said base support structure reaction vessel array;
   c. a plurality of physical chemistry teabags, said plurality of physical chemistry teabags having at least one predetermined fixed reactant thereon;
   d. a fixed-reactant/liquid reactant mixture shifting means adapted to alter specific fixed reactant-liquid reactant mixture combinations for at least a portion of said plurality of physical chemistry teabags relative to the liquid reactant mixture content of said plurality of reaction vessels, said fixed reactant-liquid reactant mixture shifting means being a dynamic fluid flow system and each of said plurality of reaction vessels includes at least one liquid channel connected thereto and connected to valve and supply means for filling and draining said plurality of reaction vessels with a sequence of different liquid reactant mixture arrays, each of said different reactant mixture arrays having at least one liquid reactant mixture; and, e. programmable flow means to provide for simultaneous and sequential filling and draining said plurality of reaction vessels with a plurality of different liquid reaction mixtures for each of a plurality of different fixed-reactant/liquid reactant mixture combination array sequences;

B. providing said plurality of reaction vessels with a plurality of different liquid reactant mixtures;

C. operating said fixed-reactant/liquid reactant mixture shifting means so as to insert said plurality of physical chemistry teabags into said plurality of reaction vessels in a first position matrix for a sufficient holding time to create at least a first chemical compound synthesis;

D. operating said fixed-reactant/liquid reactant mixture shifting means so as to remove said plurality physical chemistry teabags from said plurality of reaction vessels; and, E. operating said fixed-reactant/liquid mixture shifting means so as to relocate at least one of said plurality of physical chemistry teabags relative to said plurality of reaction vessel and subsequently inserting said plurality of physical chemistry teabags into said plurality of reaction vessels in a second position matrix so that at least one of said physical chemistry teabags is positioned in a different reaction vessel from the reaction vessel of the first position matrix for a sufficient holding time to create at least a second chemical compound synthesis.

2. The method of claim 1 wherein said fixed-reactant/liquid reactant mixture shifting means is a fluid flow means and said plurality of reaction vessels includes at least one liquid channel connected thereto for filling and draining said reaction vessels with at least one liquid reactant mixture, and said apparatus further includes sufficient channel, valve and supply means for filling and draining said plurality of reaction vessels with said at least one liquid reactant mixture and wherein said method further includes the step of draining at least one reaction vessel after said plurality of physical chemistry teabag has been held in said first position matrix and filling said at least one of said plurality of reaction vessels with a second, different liquid reaction mixture prior to said at least a second chemical compound synthesis.

3. The method of claim 2 which further includes the step of monitoring and controlling the temperature of at least one reaction vessel.

4. The method of claim 3 wherein said temperature is controlled by adjustment to temperature adjustment means selected from the group consisting of heating means, cooling means and combinations thereof.

5. The method of claim 2 wherein said programmable flow means includes programmable temperature control means which are included in said apparatus and are connected to the apparatus to permit programmable movement, programmable liquid reactant mixture flow and programmable temperature monitoring and control, and said method further includes preprogramming said programmable movement, programmable liquid reactant mixture flow and programmable temperature monitoring and control.

6. The method of claim 1 wherein said fixed-reactant/liquid reactant mixture shifting is a mechanical movement means which includes programmable robotic means and said method further includes a sequential series of movements of predetermined simultaneous insertion, hold and removal motions of said physical chemistry teabags with said plurality of reaction vessels so as to create a sequential series of different chemical compound synthesis when each sequence of said series includes a plurality of simultaneous different chemistry compound synthesis.

7. The method of claim 6 which further includes the step of monitoring and controlling the temperature of at least one reaction vessel.

8. The method of claim 7 wherein said temperature is controlled by adjustment to temperature adjustment means selected from the group consisting of heating means, cooling means and combinations thereof.

9. The method of claim 6 wherein said mechanical means further includes programmable temperature control means in said apparatus which is connected to the apparatus to permit both programmable movement with said programmable robotic means and programmable temperature monitoring and control, and said method further includes preprogramming both said programmable robotic means, and programmable temperature monitoring and control.

10. The method of claim 1 wherein preprogrammable robotic means is included in said mechanical movement means, and said method further includes preprogramming said preprogrammable robotic means to effect a sequence of movements which includes a sequential series of predetermined simultaneous insertion, hold and removal motion of said physical chemistry tea bags with said plurality of reaction vessels, including at least one relocation movement for sequential movement of said plurality of physical chemistry teabags, so as to relocate a given physical chemistry teabag at least from a first reaction vessel to a second reaction vessel and subsequently at least one relocation movement to relocate said physical chemistry teabag from a second reaction vessel to a third reaction vessel.

11. The method of claim 1 wherein said fixed-reactant/liquid reactant mixture shifting means includes both fluid flow means fluid flow means and said plurality of reaction vessels includes at least one liquid channel connected thereto for filling and draining said reaction vessels with at least one liquid reactant mixture, and said apparatus further includes sufficient channel, valve and supply means for filling and draining said plurality of reaction vessels with said at least one liquid reactant mixture and wherein said method further includes the step of draining at least one reaction vessel after said plurality of physical chemistry teabag has been held in said first position matrix and filling said at least one of said plurality of reaction vessels with a second, different liquid reaction mixture prior to said at least a second chemical compound synthesis, and mechanical movement means which includes programmable robotic means and said method further includes a sequential series of movements of predetermined simultaneous insertion, hold and removal motions of said physical chemistry teabags with said plurality of reaction vessels so as to create a sequential series of different chemical compound synthesis when each sequence of said series includes a plurality of simultaneous different chemistry compound synthesis.

12. A method for synthesizing a plurality of chemical compounds simultaneously and to synthesize a series of plurality of simultaneously synthesized chemical compounds sequentially utilizing a dynamic matrix system, which comprises:

A. providing apparatus which includes:
    a. a base support structure having a plurality of reaction vessels arranged in at least a two dimensional predetermined array, each of said reaction vessels having sufficient wall and bottom structure to support and contain a liquid reactant mixture, each of said reaction vessels adapted to receive physical chemistry teabags therein for chemical synthesis;

b. a physical chemistry teabag support structure adapted to hold and support a plurality of physical chemistry teabags arranged in at least a two dimensional predetermined teabag array, corresponding to said base support structure reaction vessel array;

c. a plurality of physical chemistry teabags, said plurality of physical chemistry teabags having at least one predetermined fixed reactant thereon;

d. a fixed-reactant/liquid reactant mixture shifting means adapted to alter specific fixed reactant-liquid reactant mixture combinations for at least a portion of said plurality of physical chemistry teabags relative to the liquid reactant mixture content of said plurality of reaction vessels, wherein said fixed-reactant/liquid reactant mixture shifting means is a mechanical movement means connected to at least one of said base support structure and said physical chemistry teabag support structure and adapted to effect three dimensional movement between said base support structure and said physical chemistry teabag support structure so as to provide an in-out movement capability for simultaneous insertion, simultaneous hold and simultaneous removal motion of said plurality of physical chemistry teabags with said plurality of reaction vessels, and so as to provide relocation movement capability for sequential movement of said plurality of physical chemistry teabag for a plurality of steps in a multiple syntheses sequence so as to relocate a given physical chemistry teabag at least from a first reaction vessel to a second reaction vessel; and, e. programmable mechanical means to effect a sequence of movements which include a sequential series of predetermined simultaneous insertion, hold, removal motion of said physical chemistry teabags with said plurality of reaction vessels, including at least one relocation movement for sequential movement of said plurality of physical chemistry teabags, so as to relocate a given physical chemistry teabag at least from a first reaction vessel to a second reaction vessel, and subsequently at least one relocation movement to relocate said physical chemistry teabag from a second reaction vessel to a third reaction vessel;

B. providing said plurality of reaction vessels with a plurality of different liquid reactant mixtures;

C. operating said fixed-reactant/liquid reactant mixture shifting means so as to insert said plurality of physical chemistry teabags into said plurality of reaction vessels in a first position matrix for a sufficient holding time to create at least a first chemical compound synthesis;

D. operating said fixed-reactant/liquid mixture shifting means so as to remove said plurality physical chemistry teabags from said plurality of reaction vessels; and, E. operating said fixed-reactant/liquid reactant mixture shifting means so as to relocate at least one of said plurality of physical chemistry teabags relative to said plurality of reaction vessel and subsequently inserting said plurality of physical chemistry teabags into said plurality of reaction vessels in a second position matrix so that at least one of said physical chemistry teabags is positioned in a different reaction vessel from the reaction vessel of the first position matrix for a sufficient holding time to create at least a second chemical compound synthesis.

13. The method of claim 12 wherein said temperature is controlled by adjustment to temperature adjustment means selected from the group consisting of heating means, cooling means and combinations thereof.

14. The method of claim 12 wherein said programmable flow means includes programmable temperature control means which are included in said apparatus and are connected to the apparatus to permit programmable movement, programmable liquid reactant mixture flow and programmable temperature monitoring and control, and said method further includes preprogramming said programmable movement, programmable liquid reactant mixture flow and programmable temperature monitoring and control.

15. The method of claim 12 wherein preprogrammable robotic means is included in said mechanical movement means, and said method further includes preprogramming said preprogrammable robotic means to effect a sequence of movements which includes a sequential series of predetermined simultaneous insertion, hold and removal motion of said physical chemistry tea bags with said plurality of reaction vessels, including at least one relocation movement for sequential movement of said plurality of physical chemistry teabags, so as to relocate a given physical chemistry teabag at least from a first reaction vessel to a second reaction vessel and subsequently at least one relocation movement to relocate said physical chemistry teabag from a second reaction vessel to a third reaction vessel.

16. A method for synthesizing a plurality of chemical compounds simultaneously and to synthesize a series of plurality of simultaneously synthesized chemical compounds sequentially utilizing a dynamic matrix system, which comprises:

A. providing apparatus which includes:

a. a base support structure having a plurality of reaction vessels arranged in at least a two dimensional predetermined array, each of said reaction vessels having sufficient wall and bottom structure to support and contain a liquid reactant mixture, each of said reaction vessels adapted to receive physical chemistry teabags therein for chemical synthesis;

b. a physical chemistry teabag support structure adapted to hold and support a plurality of physical chemistry teabags arranged in at least a two dimensional predetermined teabag array, corresponding to said base support structure reaction vessel array;

c. a plurality of physical chemistry teabags, said plurality of physical chemistry teabags having at least one predetermined fixed reactant thereon;

d. a fixed-reactant/liquid reactant mixture shifting means adapted to alter specific fixed reactant-liquid reactant mixture combinations for at least a portion of said plurality of physical chemistry teabags relative to the liquid reactant mixture content of said plurality of reaction vessels, wherein said fixed-reactant/liquid reactant mixture shifting means is both a mechanical movement means and a dynamic fluid flow system, said mechanical movement means being connected to at least one of said base support structure and said physical chemistry teabag support structure and adapted to effect three dimensional movement between said base support structure and said physical chemistry teabag support structure so as to provide an in-out movement capability for simultaneous insertion, simultaneous hold and simultaneous removal motion of said plurality of physical chemistry teabags with said plurality of reaction vessels, and so as to provide relocation movement capability for sequential movement of said plurality of physical chemistry teabag for a plurality of steps in a multiple syntheses sequence so as to relocate a given physical chemistry teabag at least from a first reaction vessel to a second reaction vessel, and said dynamic fluid flow system and each of said plurality of reaction vessels includes at least one liquid channel connected thereto and connected to valve and supply means for filling and draining said plurality of reaction vessels with a sequence of different liquid reactant mixture arrays, each of said different reactant mixture arrays having at least one liquid reactant mixture;

e. programmable mechanical means to effect a sequence of movements which include a sequential series of predetermined simultaneous insertion, hold, removal motion of said physical chemistry teabags with said plurality of reaction vessels, including at least one relocation movement for sequential movement of said plurality of physical chemistry teabags, so as to relocate a given physical chemistry teabag at least from a first reaction vessel to a second reaction vessel, and subsequently at least one relocation movement to relocate said physical chemistry teabag from a second reaction vessel to a third reaction vessel; and, f. programmable flow means to provide for simultaneous filling and draining said plurality of reaction vessels with a plurality of different liquid reaction mixtures for each of a plurality of different fixed-reactant/liquid reactant mixture combination array sequences;

B. providing said plurality of reaction vessels with a plurality of different liquid reactant mixtures;

C. operating said fixed-reactant/liquid reactant mixture shifting means so as to insert said plurality of physical chemistry teabags into said plurality of reaction vessels in a first position matrix for a sufficient holding time to create at least a first chemical compound synthesis;

D. operating said fixed-reactant/liquid mixture shifting means so as to remove said plurality physical chemistry teabags from said plurality of reaction vessels; and, E. operating said fixed-reactant/liquid mixture shifting means so as to relocate at least one of said plurality of physical chemistry teabags relative to said plurality of reaction vessel and subsequently inserting said plurality of physical chemistry teabags into said plurality of reaction vessels in a second position matrix so that at least one of said physical chemistry teabags is positioned in a different reaction vessel from the reaction vessel of the first position matrix for a sufficient holding time to create at least a second chemical compound synthesis.

17. The method of claim 16 wherein said temperature is controlled by adjustment to temperature adjustment means selected from the group consisting of heating means, cooling means and combinations thereof.

18. The method of claim 16 wherein said programmable flow means includes programmable temperature control means which are included in said apparatus and are connected to the apparatus to permit programmable movement, programmable liquid reactant mixture flow and programmable temperature monitoring and control, and said method further includes preprogramming said programmable movement, programmable liquid reactant mixture flow and programmable temperature monitoring and control.

19. The method of claim 16 which further includes the step of monitoring and controlling the temperature of at least one reaction vessel.

20. The method of claim 16 wherein said fixed-reactant/liquid reactant mixture shifting is a mechanical movement means which includes programmable robotic means and said method further includes a sequential series of movements of predetermined simultaneous insertion, hold and removal motions of said physical chemistry teabags with said plurality of reaction vessels so as to create a sequential series of different chemical compound synthesis when each sequence of said series includes a plurality of simultaneous different chemistry compound synthesis.

* * * * *